(12) United States Patent
Pearson

(10) Patent No.: US 9,272,783 B2
(45) Date of Patent: Mar. 1, 2016

(54) LONG ENDURANCE AIRCRAFT

(75) Inventor: Jerome Pearson, Mount Pleasant, SC (US)

(73) Assignee: Star Technology and Research, Inc., Mount Pleasant, SC (US)

( * ) Notice: Subject to any disclaimer, the term of this patent is extended or adjusted under 35 U.S.C. 154(b) by 1445 days.

(21) Appl. No.: 12/058,520

(22) Filed: Mar. 28, 2008

(65) Prior Publication Data

US 2009/0032648 A1 Feb. 5, 2009

Related U.S. Application Data

(60) Provisional application No. 60/920,481, filed on Mar. 28, 2007.

(51) Int. Cl.
*B64C 39/02* (2006.01)

(52) U.S. Cl.
CPC ......... *B64C 39/024* (2013.01); *B64C 2201/028* (2013.01); *B64C 2201/042* (2013.01); *B64C 2201/102* (2013.01)

(58) Field of Classification Search
CPC ............ B64C 39/024; B64C 2201/102; B64C 2201/028; B64C 2201/042
USPC ............................... 244/10, 49, 123.11, 158.3
See application file for complete search history.

(56) References Cited

U.S. PATENT DOCUMENTS

| | | | |
|---|---|---|---|
| 1,730,249 A | 10/1929 | Smith | |
| 2,193,029 A | 3/1940 | Juul | |
| 3,092,355 A | 6/1963 | Brown | |
| 3,153,877 A * | 10/1964 | Effinger, Jr. et al. | 446/57 |
| 3,463,420 A * | 8/1969 | Carter et al. | 244/46 |
| 3,507,464 A | 4/1970 | Rogallo | |
| 4,090,684 A | 5/1978 | Look et al. | |
| 4,106,727 A | 8/1978 | Ortell | |
| 4,415,153 A | 11/1983 | Yokoi | |
| 4,697,761 A | 10/1987 | Long | |
| 4,907,764 A * | 3/1990 | Long | 244/62 |
| 5,810,284 A | 9/1998 | Hibbs et al. | |
| 5,884,863 A | 3/1999 | Fisher et al. | |
| 5,927,643 A | 7/1999 | Figge, Sr. | |
| 6,045,089 A | 4/2000 | Chen | |
| 6,119,976 A | 9/2000 | Rogers | |
| 6,241,195 B1 | 6/2001 | Wagner, III | |
| 6,568,633 B2 | 5/2003 | Dunn | |

(Continued)

OTHER PUBLICATIONS

"Pathfinder and the Development of Solar Rechargeable Aircraft," E&TR 1994, (9 pages).

(Continued)

*Primary Examiner* — Valentina Xavier
(74) *Attorney, Agent, or Firm* — Dicke, Billig & Czaja, PLLC

(57) ABSTRACT

A long endurance powered aircraft includes a fuselage, a propeller coupled to the fuselage, a wing coupled to the fuselage, and an energy storage system disposed within the fuselage. The wing includes an adjustable surface area including solar cells configured to collect incident solar energy and convert the collected incident solar energy to electrical energy for powering the aircraft during daylight flight. The energy storage system is configured to convert excess electrical energy converted from collected incident solar energy to chemical energy, store the chemical energy, and convert the stored chemical energy to electrical energy for powering the aircraft during night flight.

18 Claims, 28 Drawing Sheets

(56) References Cited

U.S. PATENT DOCUMENTS

| | | |
|---|---|---|
| 6,705,568 B2 | 3/2004 | Lee |
| 6,742,741 B1 | 6/2004 | Rivoli |
| 6,758,442 B2 | 7/2004 | Bailey |
| 6,845,948 B2 | 1/2005 | Thomas |
| 6,899,298 B2 | 5/2005 | Lee |
| 7,137,596 B2 | 11/2006 | Garrigus et al. |
| 7,306,187 B2 * | 12/2007 | Lavan ................. 244/123.11 |
| 7,762,495 B2 | 7/2010 | Miller |
| 2001/0028018 A1 | 10/2001 | Darbyshire |
| 2006/0144992 A1 | 7/2006 | Jha et al. |
| 2008/0121755 A1 | 5/2008 | Bennett |
| 2009/0008507 A1 | 1/2009 | Pearson |
| 2009/0014596 A1 | 1/2009 | Pearson et al. |
| 2009/0206194 A1 * | 8/2009 | Sinsabaugh ................. 244/24 |
| 2009/0314886 A1 * | 12/2009 | Clancy et al. ............. 244/1 TD |
| 2010/0282897 A1 * | 11/2010 | de la Torre ................. 244/49 |

OTHER PUBLICATIONS

"A Gateway Into Future Aeronautics," N.A.S.A., http://www.nasa.gov/centers/dryden/history/pastprojects/Erast/erast_prnt.htm , (4 pages).

The Office Action for U.S. Appl. No. 12/058,482 mailed Oct. 12, 2011 (11 pages).

The Restriction Requirement for U.S. Appl. No. 12/058,482 mailed Jun. 13, 2011 (7 pages).

The Office Action for U.S. Appl. No. 12/058,466 mailed Oct. 13, 2011 (11 pages).

The Restriction Requirement for U.S. Appl. No. 12/058,466 mailed Jun. 13, 2011 (7 pages).

* cited by examiner

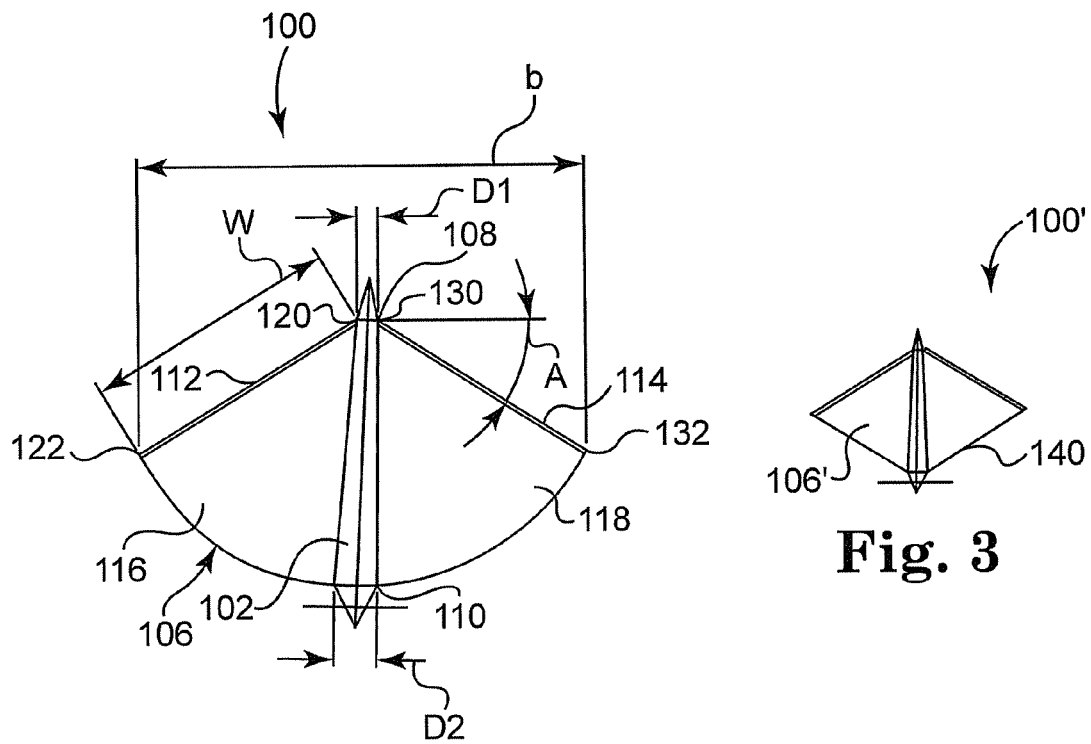
Fig. 2A
Fig. 3
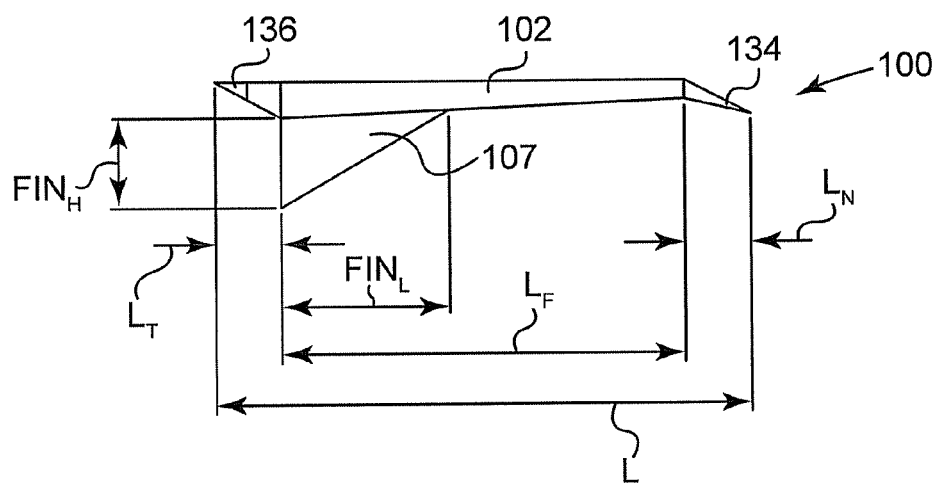
Fig. 2B

Lift Coefficient vs. Angle of Attack for 3 Wing Sweep Angles

L/D vs. Lift Coefficient at 3 Wing Sweep Angles

Angle of Attack vs. Sweep Angle and Lift Coefficient

Cruise Power vs. Wing Area and Lift Coefficient

LONG ENDURANCE AIRCRAFT

CROSS-REFERENCE TO RELATED APPLICATION

This Non-Provisional Patent Application claims the benefit of the filing date of U.S. Provisional Patent Application Ser. No. 60/920,481 filed Mar. 28, 2007, entitled "LONG ENDURANCE AIRCRAFT."

BACKGROUND

Recent attempts to achieve high-altitude, long-endurance flight for aircraft have been based on two approaches. The first approach focused on a lighter-than-air, blimp-like craft having solar cells and electric motors driving multiple propellers. The second approach focused on a conventional aircraft having long, narrow conventional airfoils/wings (high aspect ratio wings) covered with solar cells and having multiple electric motors and propellers disposed along the wings.

An example of the first approach includes the High-Altitude Airship by Lockheed Martin fabricated for the Missile Defense Agency, which has the potential to be unwieldy, expensive, and susceptible to high wind loads. An example of the second approach includes the Helios craft fabricated by Aerovironment for NASA, which had fragile, 240-foot long wings. Helios crashed due to turbulence and aeroelastic instability off Hawaii in 2003.

According to the Breguet endurance formula for propeller-driven aircraft, an aircraft's endurance is proportional to $\eta$, the propeller efficiency, $C_L^{3/2}/C_D$, where $C_L$ is the lift coefficient and $C_D$ is the drag coefficient, and $\sqrt{(\rho S)}$, where $\rho$ is the air density and S is the wing area. Conventionally, if the aircraft does not carry fuel but is rather powered by solar energy, it is designed to have the lowest possible weight (Wt) and the highest possible energy storage efficiency E/Wt to enable flight during the night.

One way to increase $C_L^{3/2}/C_D$ is with high-aspect-ratio, long flimsy wings that are known to inhibit aircraft safety and maneuverability. Increasing the wing area S in a conventional wing adds too much weight, and adding battery-assisted solar cells or fuel cells makes the vehicle too heavy, which reduces payload ratio.

For these and other reasons, there is a need for the present invention.

SUMMARY

One aspect provides a long endurance powered aircraft. The long endurance powered aircraft includes a fuselage, a propeller coupled to the fuselage, a wing coupled to the fuselage, and an energy storage system disposed within the fuselage. The wing includes an adjustable surface area including solar cells configured to collect incident solar energy and convert the collected incident solar energy to electrical energy for powering the aircraft during daylight flight. The energy storage system is configured to convert excess electrical energy converted from collected incident solar energy to chemical energy, store the chemical energy, and convert the stored chemical energy to electrical energy for powering the aircraft during night flight.

One aspect provides a long endurance powered aircraft. The aircraft includes a fuselage, a propeller coupled to an aft portion of the fuselage, a wing coupled to the fuselage, and an energy storage system disposed within the fuselage. The wing includes an area-adjustable surface including solar cells, wherein the area-adjustable surface of the wing is expandable to a first area that is configured to collect solar energy that is converted to electrical energy and employed for powering the propeller during daylight flight. The energy storage system configured to store excess energy converted from collected solar energy for powering the propeller during night flight.

One aspect provides a method of operating a long endurance powered aircraft. The method includes deploying an aircraft including a wing retractably stowed against a central spar, the wing having solar cells. The method additionally includes extending the wing away from the central spar and exposing the solar cells to incident solar energy. The method further includes collecting a portion of the incident solar energy and converting the collected incident solar energy to electrical energy, and powering the aircraft at a first altitude with a first portion of the electrical energy converted from the collected incident solar energy. The method further includes powering the aircraft at a second altitude lower than the first altitude with a second portion of the electrical energy converted from the collected incident solar energy.

One aspect provides a long endurance powered aircraft including a fuselage, a propeller coupled to the fuselage, a solid energy collecting wing coupled to the fuselage, and an energy storage system disposed within a forward portion of the fuselage. The energy storage system is coupled to the propeller and includes a fluid tank configured to provide the aircraft with a substantially adjustable center of gravity.

BRIEF DESCRIPTION OF THE DRAWINGS

FIG. 2A is a top view of the aircraft shown in FIG. 1.

FIG. 2B is a side view of the aircraft shown in FIG. 1.

FIG. 3 is a top view of a long endurance powered aircraft including a wing having a straight trailing edge according to one embodiment.

DETAILED DESCRIPTION

In the following Detailed Description, reference is made to the accompanying drawings, which form a part of this specification, and in which is illustrated specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration only and is in no way limiting. It is to be understood that other embodiments may be utilized and structural or logical changes may be made without departing from the scope of the disclosure. The following Detailed Description teaches exemplary embodiments that are not to be taken in a limiting sense. The scope is defined by the appended claims.

Embodiments provide a long endurance powered aircraft having wings that collect solar energy and a system to store excess collected solar energy such that the long endurance powered aircraft is configured to fly at high altitudes during daylight flight and lower altitudes at night for days or weeks on end. Embodiments of the long endurance powered aircraft are configured to collect incident solar energy and convert the collected incident solar energy to electrical energy for powering high altitude flight (e.g., between about 27,000-33,000 meters) during periods of sun shine. Embodiments of the long endurance powered aircraft are configured to convert excess electrical energy converted from the collected incident solar energy to chemical energy that is stored in an energy storage system. Embodiments of the energy storage system are configured to convert the stored chemical energy to electrical energy for powering flight at an altitude of between about 17,000-23,000 meters during periods of low or no sun shine (e.g., at night). Embodiments provide a wing having a single thickness and solar cells integrated into the wing thickness, where the wing is characterized by a wing loading of less than 1 pound per square foot when in a deployed state.

Figure 1:
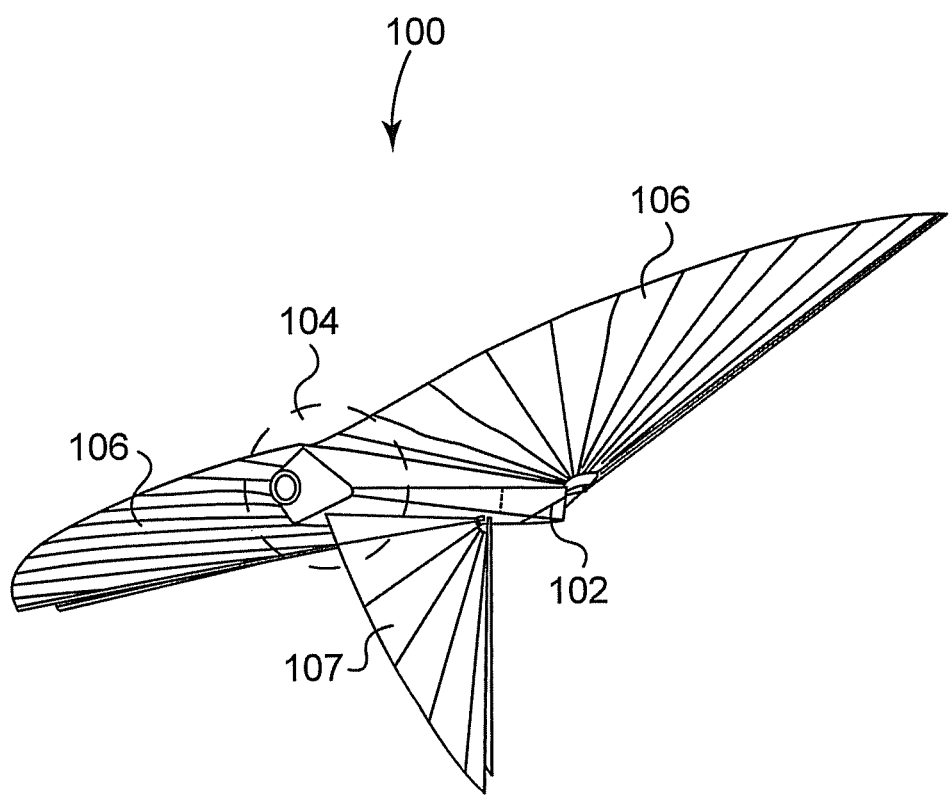
FIG. 1 is a perspective view of a long endurance powered aircraft according to one embodiment.

FIG. 1 is a perspective view of a long endurance powered aircraft 100 according to one embodiment. The aircraft 100 includes a central spar 102, a propeller 104 coupled to central spar 102, a wing 106 coupled to central spar 102, and a fin 107 coupled to central spar 102 in a plane different from a plane of wing 106.

In this specification, the term "endurance" means the time of flight between deployment of the aircraft and landing. The phrase "long endurance" means a time between deployment and landing that is greater than at least 14 days, and preferably greater than about 45 days. Embodiments described below provide a powered aircraft 100 that is configured for long endurance, or in the parlance of those skilled in the art, of nearly "perpetual" flight that includes a wing 106 configured to collect energy and central spar 102 configured to store energy that enables aircraft 100 to remain aloft over a wide range of terrestrial latitudes in any solar season. Certain embodiments relate to a high-altitude air vehicle configured to stay aloft at altitudes of between 65,000-100,000 feet for nearly indefinite periods of time enabling the high-altitude air vehicle to observe large areas of Earth and function as a virtual "20-mile-high" relay tower in the sky.

In this specification, the term "flexible" means drapeable as characterized by a sheet that drapes under the influence of its own weight to substantially conform to the item over which it is placed.

In varying embodiments, wing 106 is structured as a parawing or a sail wing or a delta wing. In one embodiment, wing 106 includes an area-adjustable surface having solar cells (described below) to collect energy and a capacitor to store energy, and central spar 102 includes fuel cells that are configured to store the energy collected by wing 106.

In one exemplary embodiment, wing 106 includes an upper surface of solar cells configured to collect sunlight, and a lower surface of wing 106 includes infrared cells that are configured to absorb energy radiated from a planet or energy directed in a focused manner from the planet (such as from a microwave emitter). In other embodiments, wing 106 is fabricated as a capacitor that is configured to collect a portion of incident solar energy, convert the collected solar energy to electrical energy, and store the electrical energy for powering flight. During flight, wing 106 is expanded and collects solar energy, which enables aircraft 100 to fly at altitudes of up to about 100,000 feet. During flight after sunset or during periods of low sun angle, aircraft 100 is configured to fly at lower altitudes (i.e., above 60,000) by powering propeller 104 with electrical energy stored in fuel cells located within central spar 102.

FIG. 2A is a top plan view of aircraft 100 and FIG. 2B illustrates a side view of aircraft 100 according to one embodiment. Central spar 102 defines a leading end 108 and a trailing end 110. Wing 106 includes a first spar 112 and a separate second spar 114, and a first wing sheet 116 coupled between first spar 112 and central spar 102, and a second wing sheet 118 coupled between second spar 114 and central spar 102.

Spars 112, 114 are coupled adjacent to leading end 108 of central spar 102. Wing 106 is in a deployed orientation such that wing sheet 116 extends between 112 and central spar 102, and wing sheet 118 extends between second spar 114 and central spar 102. Push prop 104 is coupled to trailing end 110 of central spar 102.

In one embodiment, first spar 112 defines a leading end 120 and a trailing end 122, and leading end 120 of first spar 112 is coupled to leading end 108 of central spar 102. In one embodiment, second spar 114 defines a leading end 130 and a trailing end 132, and leading end 130 of second spar 114 is coupled to leading end 108 of central spar 102. During flight, trailing ends 122, 132 of the respective spars 112, 114 are moved selectively relative to central spar 102 to define a morphing wing configured to change shape to optimize flight parameters for aircraft 100 in response to changes in flight conditions. In one embodiment, trailing ends 122, 132 of the respective spars 112, 114 are moved differentially and selectively relative to central spar 102 to configure aircraft 100 for flight in response to changing flight conditions.

Spars 112, 114 move relative to central spar 102. In one embodiment, aircraft 100 defines a wing span b extending between trailing end 122 and trailing end 132 of extended spars 112, 114, respectively. Each of the spars 112, 114 define a length W. Spars 112, 114 are configured such trailing ends 122, 132 move away from central spar 102 to define a variable wing angle A for the sweep of wing 106. Thus, wing span b is given by the relationship b=2 W Cos A. As illustrated in FIG. 2A, a trailing edge of wing 106 between trailing end 110 of central spar 102 and trailing ends 112, 132 of spars 112, 114 respectively, is curvilinear.

In one embodiment, central spar 102 is tapered in cross-sectional area and defines a leading thickness D1 and a trailing thickness D2, where D1 and D2 are not necessarily the same. A frontal area of central spar is less than a cross-sectional area of tail trailing end 110, such that D1 is less than D2.

With reference to FIG. 2B, in one embodiment fin 107 is a ventral fin extending downward from a lower surface of central spar 102. Ventral fin 107 is configured to extend/retract relative to central spar 102 to provide yaw stability for aircraft 100. Embodiments of fin 107 provide for the collection of solar energy, as described below. Aircraft 100 defines a total length L extending between nose 134 and tail 136, where nose 134 has a nose length $L_N$, tail 136 has a tail length $L_T$, and central spar 102 has a fuselage length $L_F$. In this regard, total length L is the sum of nose length $L_N$, tail length $L_T$, and fuselage length $L_F$. In one embodiment, fin 107 includes a fin length $FIN_L$ and a fin height $FIN_H$.

In one embodiment, aircraft 100 total length L is between about 250 and 300 inches, a fuselage length F is between 190 and 210 inches, $FIN_L$ is between about 70 and 100 inches, and a fin height $FIN_H$ is between about 30 and 50 inches. In one exemplary embodiment, aircraft 100 has a total length L of 270.6 inches, a fuselage length LF of 204 inches, a $FIN_L$ of 85.34 inches, a $FIN_H$ of 42.5 inches. The dimensions stated above are one example of suitable dimensions for aircraft 100. In one embodiment, aircraft 100 total length L is between about 40-50 feet, a fuselage length LF is between 30-40 feet, $FIN_L$ is between about 20-30 feet, and a fin height $FIN_H$ is between about 6-8 feet. In one exemplary embodiment, aircraft 100 has a total length L of 40 feet, a fuselage length LF of 32 feet, a $FIN_L$ of 20 feet, a $FIN_H$ of 8 feet, although other suitable dimensions are also acceptable.

In one embodiment, central spar 102 is a multi-functional structure that provides rigidity for aircraft 100 and stores fuel cells and solar-to-electrical energy conversion components (not illustrated). For example, in one embodiment central spar 102 houses an electrolyzer, a plurality of fuel cells, hydrogen and oxygen gas storage tanks, a transmission and motor coupled to propeller 104, and at least one movable element, for example a water tank, having a mass sufficient to adjust a center of gravity of aircraft 100 when the mass is selectively moved along central spar 102. These components are discussed in greater detail below.

In one embodiment, central spar 102 defines a housing that maintains at least one fuel cell storage compartment. In another embodiment, central spar 102 is itself a fuel cell.

In one embodiment, propeller 104 is a push-prop mounted to trailing end 110 of central spar 102. In one embodiment, propeller 104 is an electrical propeller powered by an electrical motor energized by a battery and/or fuel cell and/or a super capacitor, described in greater detail below.

Wing 106 generally includes a thin, single-thickness solid laminate sheet, such as sheet 116, extending between a spar, for example first spar 112 and central spar 102. In one embodiment, sheet 116 is surface area-adjustable and configured to fold onto into central spar 102. In another embodiment, sheet 116 is configured to wind around central spar 102. Wing 106 is configured to retract into spar 102, wound about spar 102, or fold alongside spar 102 to minimize a surface area of wing 106 and usefully configure aircraft 100 to have a shorter wingspan suited for launch or deployment to the atmosphere. During flight, trailing ends 122, 132 of spars 112, 114, respectively, selectively diverge from central spar 102 to morph (change shape) wing 106 into an optimized configuration in response to sensed flight conditions. In one embodiment, trailing ends 122, 132 of spars 112, 114, respectively, differentially diverge from central spar 102 to morph wing 106 into an optimized flight configuration, for example when flying in a cross-wind.

In one embodiment, a deployed wing 106 defines a wing area of about 400-2000 square feet, corresponding to wing loadings between approximately 0.13-0.63 pounds per square foot. In one embodiment, wing 106 includes an area-adjustable surface that is expandable to a first deployed area suited for collecting ample incident solar energy for powering aircraft 100 during daylight flight (i.e., daylight flight is powered by only a portion of the collected and converted incident solar energy, the excess collected solar energy being converted to electrical energy and stored in a fuel cell for subsequent use). Excess collected solar energy is converted to electrical energy, which is stored in fuel cells and employed for powering aircraft 100 during night flight. During takeoff and landing, wing area is reduced to minimize wind loads, and during night flight wing 106 area is maximized and configured to fly at minimum power with low trim velocity at altitude.

In one embodiment, spars 112, 114 are multi-functional structures that provide rigidity to wing 106 and storage for fuel or fuel cell components. In one embodiment, spars 112, 114 define a generally cylindrical housing configured for maintaining one or more fuel cell components. In another embodiment, spars 112, 114 are pressurized gas tanks configured to contain gaseous matter for selective delivery to fuel cell components (not shown) maintained within central spar 102. In one embodiment, an outside diameter of spars 112, 114 is approximately 4 inches in diameter, and preferably an outside diameter of spars 112, 114 is approximately between 1 and 3 inches in diameter.

FIG. 3 is a top plan view of another embodiment of aircraft 100'. Aircraft 100' is similar to aircraft 100 (FIG. 1-FIG. 2B), except that wing 106' includes a linear trailing edge 140 to minimize the risk of trailing-edge flutter. Wing 106 is configured to selectively and/or differentially extend away from central spar 102 to optimize flight parameters of aircraft 100' in response to changes in at least one sensed flight condition.

Figure 4A:
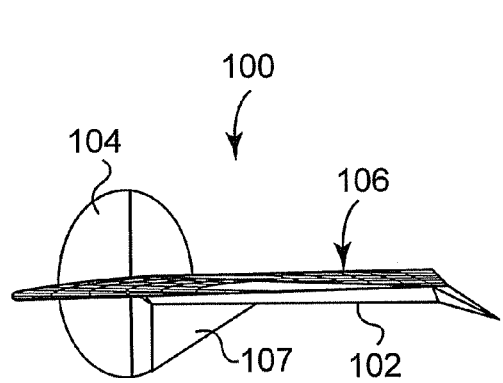
FIGS. 4A-4C are perspective views of a long endurance powered aircraft having a wing morphed into varying flight configurations according to one embodiment.
Figure 4B:
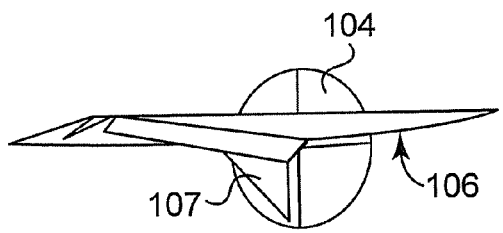
Figure 4C:
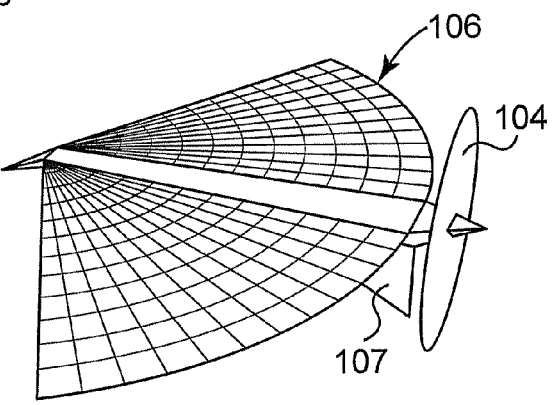

FIGS. 4A-4C are perspective views of aircraft 100 having wing 106 morphed into one flight configuration according to one embodiment. Wing 106 illustrated in FIGS. 4A-4C has a minimum dihedral.

Figure 5A:
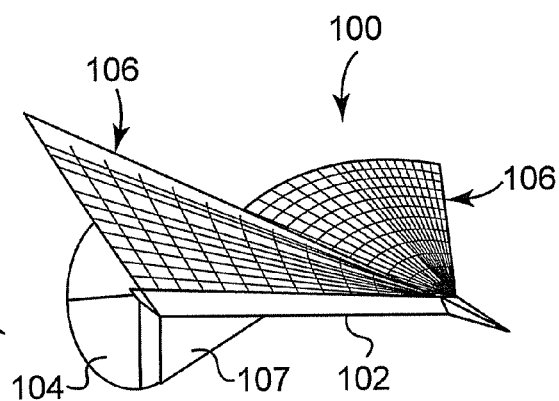
FIGS. 5A-5C are perspective views of a long endurance powered aircraft having a wing morphed into varying flight configurations different than the flight configurations shown in FIGS. 4A-4C.
Figure 5B:
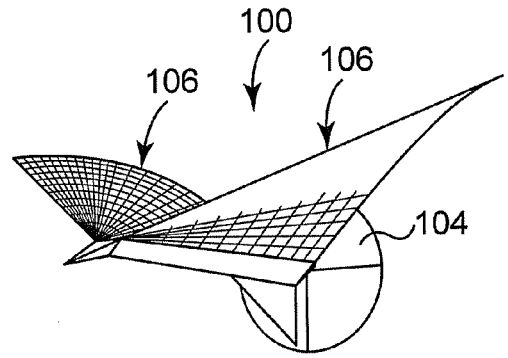
Figure 5C:
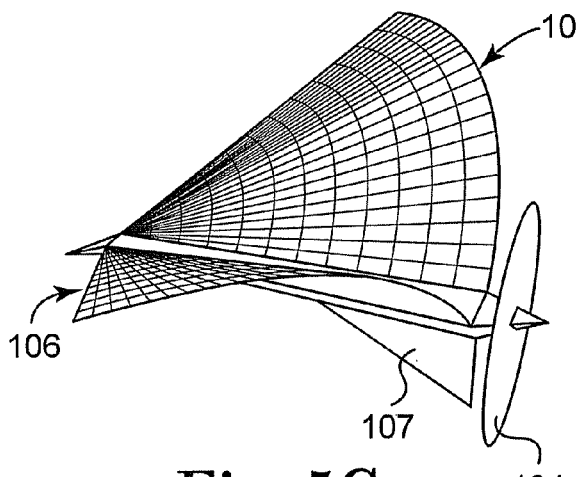

FIGS. 5A-5C are perspective views of aircraft 100 having wing 106 morphed into a flight configuration different that the flight configuration shown in FIGS. 4A-4C. Wing 106 is morphed to define a pronounced dihedral relative to central spar 102. In this regard, a configuration of wing 106 has been morphed from the substantially planar configuration illustrated in FIGS. 4A-4C to an accentuated dihedral shown in FIGS. 5A-5C. Wing 106 of FIGS. 5A-5C has morphed into a high-dihedral, more stable configuration suited for soaring at a selected fixed altitude.

Figure 6:
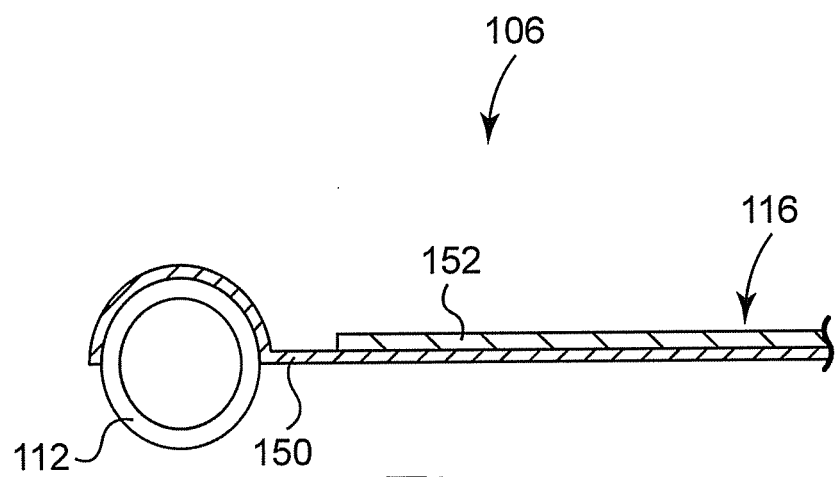
FIG. 6 is a cross-sectional view of a long endurance powered aircraft wing according to one embodiment.

FIG. 6 is a cross-sectional view of wing 106. In one embodiment, wing 106 is a single thickness wing having solar cells 152 coupled to at least one surface. In this specification, single thickness means that the wing does not have a void between an upper surface and a lower surface of the wing. In contrast, conventional airfoils and conventional wings have an upper airfoil surface separated a distance from a lower airfoil surface by a void, where the void space between the two surfaces is employed to provide the airfoil cross-sectional shape. This void space may be occupied with one or more fuel bladders, for example.

Wing 106 includes a first wing sheet 116 extending to spar 112. In one embodiment, wing 106 includes a solid laminate sheet of a thin foil 150 and solar cells 152 coupled to foil 150. Suitable thin foils 150 include polymer foils, such as Kapton™ film foils, or metal foils, such as titanium metal foils. In one embodiment, thin foil 150 is a metal foil and solar cells are flexible solar cells of Copper Indium Gallium diSelenide (CIGS) coupled to metal foil 150 that produce about 1000 W/kg. Suitable wing sheets 116 are available from United Solar Ovonics, Auburn Hills, Mich., with the solar cells integrated into metal foil or polyimide foil such as Kapton™.

In one embodiment, wing sheet 116 includes a Kapton™ foil 150 having an array of amorphous silicon thin film solar cells 152 coupled to Kapton™ foil 150. In general, wing 106 is a solid laminate structure having a single thickness that provides high specific power (watts/kg) and form-factor flexibility to enable wing 106 to morph into various configurations. Wing 106 is generally lightweight, foldable, and flexible, which enables wing 106 to curve, morph, and change configurations into a variety of complex geometric shapes. One embodiment of wing 106 includes foil 150 coupled to an outside portion of spar 112.

Figure 7:
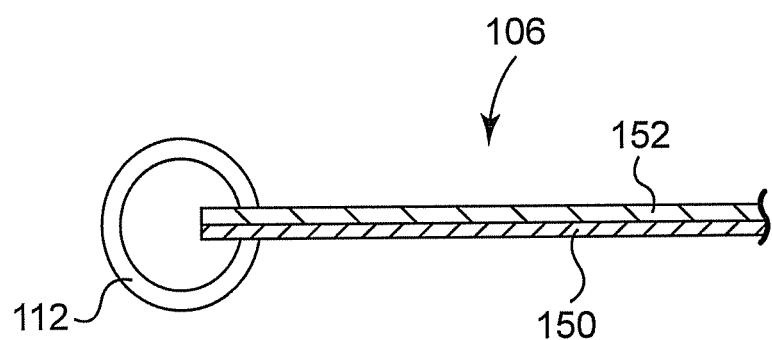
FIG. 7 is a cross-sectional view of a long endurance powered aircraft wing according to another embodiment.

FIG. 7 is a cross-sectional view of another embodiment of wing 106. Wing 106 is a flexible solid laminate sheet fabricated from a lower foil layer 150 having a layer of solar cells 152 integrated with foil layer 150. Solar cells 152 can include an array of solar cells distributed over all or a portion of a top surface of wing 106. In one embodiment, spar 112 couples about an end portion of wing 106.

Figure 8:
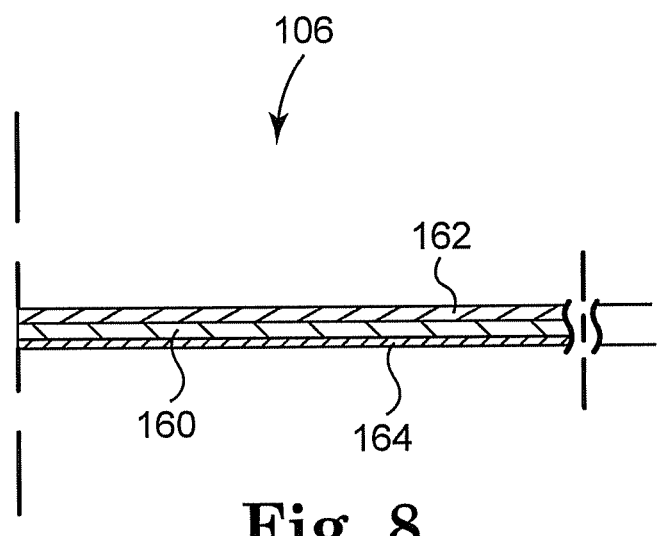
FIG. 8 is a cross-sectional view of a long endurance powered aircraft wing including solar cells separated from infrared cells.

FIG. 8 is a cross-sectional view of another embodiment of wing 106. In one embodiment, wing 106 includes a solid laminate sheet having a central foil 160 supporting solar cells 162, and infrared cells 164 coupled to foil 160 opposite of solar cells 162. In one embodiment, solar cells 162 are deposited on an upper surface of wing 106 and infrared cells 164 are deposited on a lower surface of wing 106. In this regard, solar cells 162 are oriented toward incident sunlight, and infrared cells 164 are oriented away from the sunlight source (for example toward a terrestrial surface). In this manner, solar cells 162 are configured to receive incident sunlight, and infrared cells 164 are oriented to receive long wavelength infrared or microwave emissions from a terrestrial surface. In this regard, both the upper surface of solar cells 162 and the lower surface of infrared cells 164 are configured to collect energy to power flight of aircraft 100 (FIG. 1). Collected solar energy is converted to electrical energy, and the excess collected solar energy is stored in a fuel cell located, for example, in the central spar 102.

Figure 9:
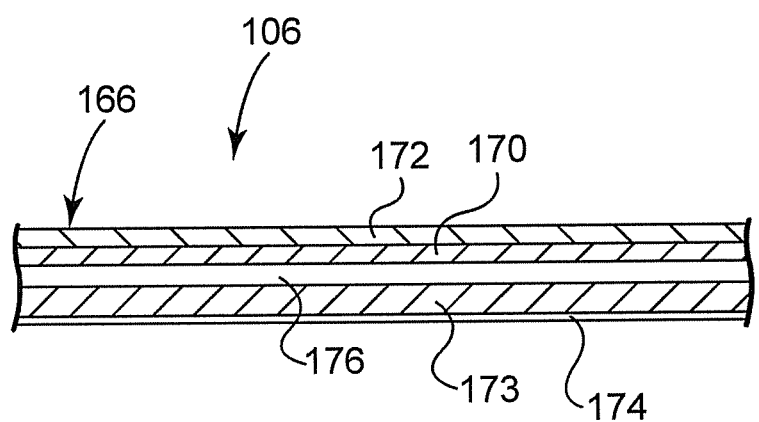
FIG. 9 is a cross-sectional view of a long endurance powered aircraft wing including a capacitor having two conducting layers separated by a dielectric layer.

FIG. 9 is one embodiment of a parawing including a parawing capacitor 166 (or super-capacitor). In one embodiment, wing 106 includes a solid laminate capacitor sheet including a first metal foil 170 having solar cells 172 disposed on a surface of metal foil 170, a second metal foil 173 having cells 174 coupled to a lower surface of metal foil 173, and a dielectric 176 disposed between metal foil 170 and metal foil 173. Separation of metal foils 170, 173 by dielectric 176 forms a capacitor 166 configured to store a net electrical charge collected on parawing capacitor 166. In one embodiment, capacitor 166 provides solar cells 172 configured to collect incident sunlight energy, and infrared cells 174 configured to collect long wavelength infrared or microwave radiation from a terrestrial surface.

In one embodiment, second metal foil 173 and cells 174 define a microwave transceiver, where cells 174 are configured to receive microwave energy for powering aircraft flight, and also configured to transmit microwave energy when suitably powered by the aircraft. In one embodiment, second metal foil 173 and cells 174 combine to define an electrical conductor configured to be tuned to receive microwave energy from a terrestrial source, such as a focused microwave emitter/beam. The received microwave energy is converted to electrical energy and stored in an onboard fuel cell for subsequent use. In this manner, aircraft 100 is configured to be powered, or recharged, in an auxiliary or alternative manner in flight to provide veritable "perpetual" endurance in contrast to conventional aircraft. In one embodiment, second metal foil 173 and cells 174 combine to define an electrical conductor configured to be tuned to transmit microwave energy from wing 106 when parawing is suitably energized by aircraft 100, for example from a stored power source within central spar 102.

Figure 10A:
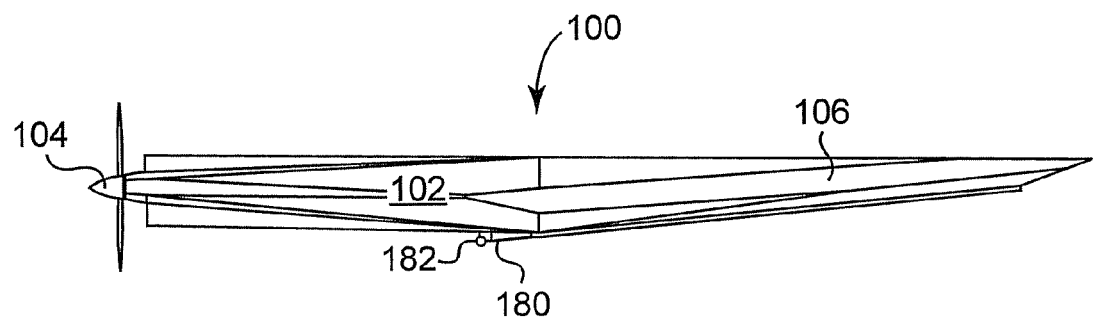
FIG. 10A is a side view of a long endurance powered aircraft including a payload pod attached to a spar of a ventral fin according to one embodiment.

FIG. 10A is a side view of aircraft 100 including a payload pod 180 according to one embodiment. Payload pod 180 includes a wheel 182. In one embodiment, payload pod 180 retracts against central spar 102 to configure aircraft 100 for flight and landing conditions. During landing, wheel 182 defines a lowermost portion of aircraft 100 and is configured to roll along the ground to permit the ground crew to stabilize wing 106 and bring aircraft 100 to a halt. To facilitate landing, and to facilitate navigation of aircraft 100, propeller 104 is configured to tilt relative to a longitudinal axis of central spar 102 to provide thrust vectoring and clearance for aircraft 100 to land.

Figure 10B:
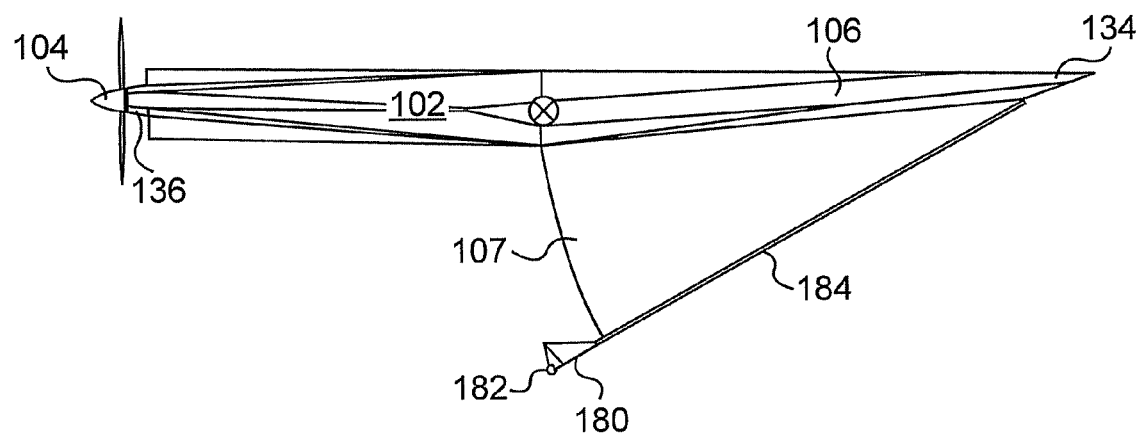
FIG. 10B is a side view of the long endurance powered aircraft shown in FIG. 10A having the payload pod deployed under the aircraft and substantially aligned with a center of gravity of the aircraft.

FIG. 10B is payload pod 180 deployed under aircraft 100 and substantially aligned with a center of gravity of aircraft 100. In one embodiment, payload pod 180 couples to a spar 184 of ventral fin 107. When spar 184 is lowered, payload pod 180 is disposed substantially under a center of gravity of aircraft 100. In this manner, payload pod 180 contributes to pitch stability, and positions optics and other portions of payload carried by payload pod 180 out of the air stream of propeller 104. As illustrated in FIG. 10B, propeller 104 is a pusher propeller, although other embodiments provide for a tractor propeller. In any regard, payload pod 180 is configured to accommodate either a pusher or tractor propeller, such that propeller 104 may be mounted at either end of aircraft 100.

In one embodiment, a single wheel 182 defines landing gear aircraft 100. In one embodiment, payload pod 180 is configured to selectively lock into a first position configured for landing aircraft 100. In one embodiment, payload pod 180 is configured to selectively collapse in a controlled manner like an air-pot, which controllably collapses aircraft 100 in a manner that enables the ground crew to run alongside aircraft 100 and collect the wings 106 during landing. In one embodiment, propeller 104 is configured to stop rotation in a horizontal position, minimizing the potential undesirable contact of the ground crew with a spinning propeller. In other embodiments, propeller 104 folds forward against central spar 102. Various embodiments of aircraft include skids at nose 134, tail 136, and outermost portions of wing 106.

Figures 11A, 11B:
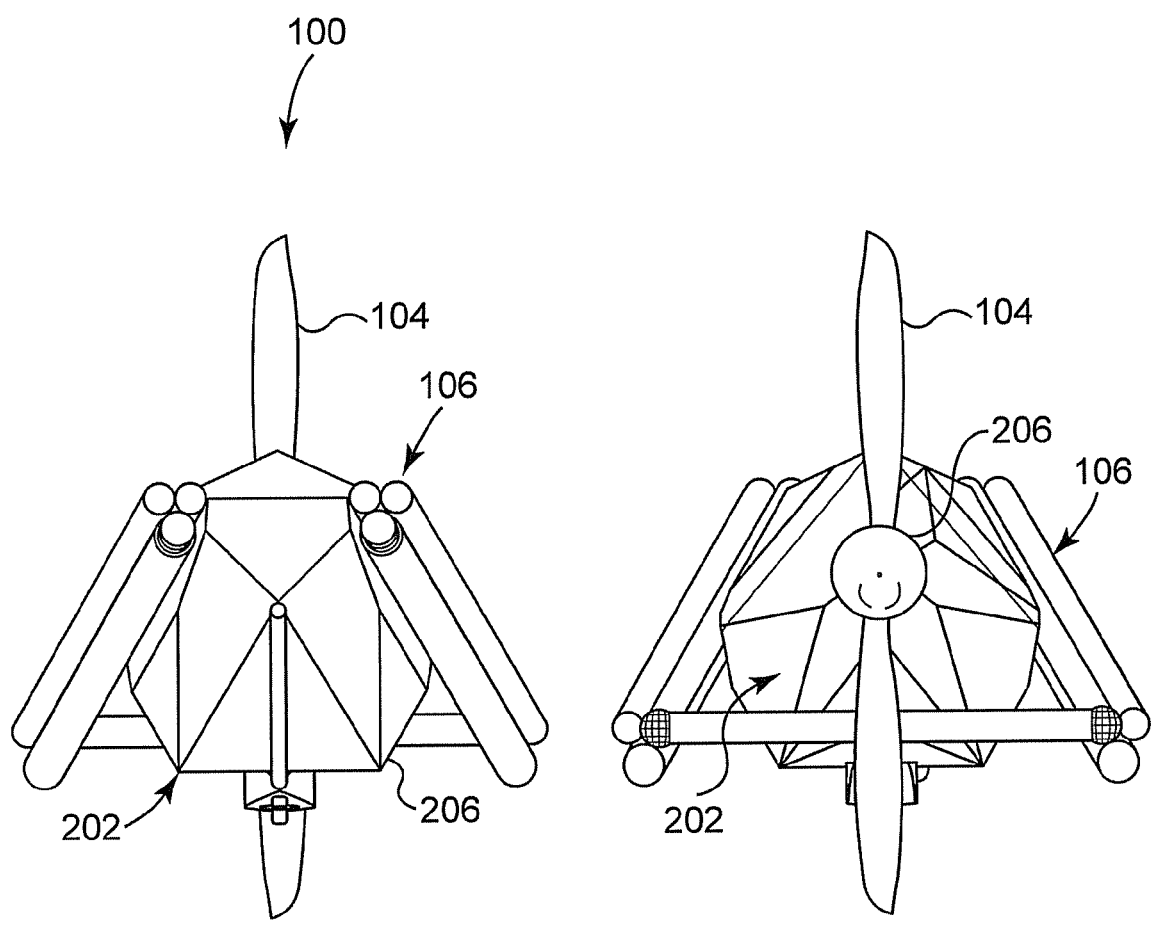
FIG. 11A is a front view of the long endurance powered aircraft shown in FIG. 1 illustrating a faceted fuselage including a wing folded against the fuselage according to one embodiment.
FIG. 11B is a back view of the long endurance powered aircraft shown in FIG. 11A.

FIG. 11A is a front view of aircraft 100 illustrating a faceted fuselage 202 having wing 106 folded against fuselage 202. In one embodiment, propeller 104 is a push-prop and faceted fuselage 202 tapers from a smaller cross-sectional area at a front 204 of aircraft 100 to a larger cross-sectional area at a rear 206 of aircraft 100. Wing 106 is configured to retract alongside faceted fuselage 202. In one embodiment, wing 106 folds alongside faceted fuselage 202 similar to folded fan. In other embodiments, wing 106 is wound or otherwise stowed alongside faceted fuselage 202.

FIG. 11B is a back view of aircraft 100. In one embodiment, faceted fuselage 202 includes a three-sided design. In another embodiment, faceted fuselage 202 is defined by more than three sides to increase an internal volume of fuselage 202 and accommodate attachment of spars at the nose 204. In one embodiment, ten full panels and one half-panel are provided that positions folded spars in a center of the faceted fuselage 202 when folded.

Figure 12:
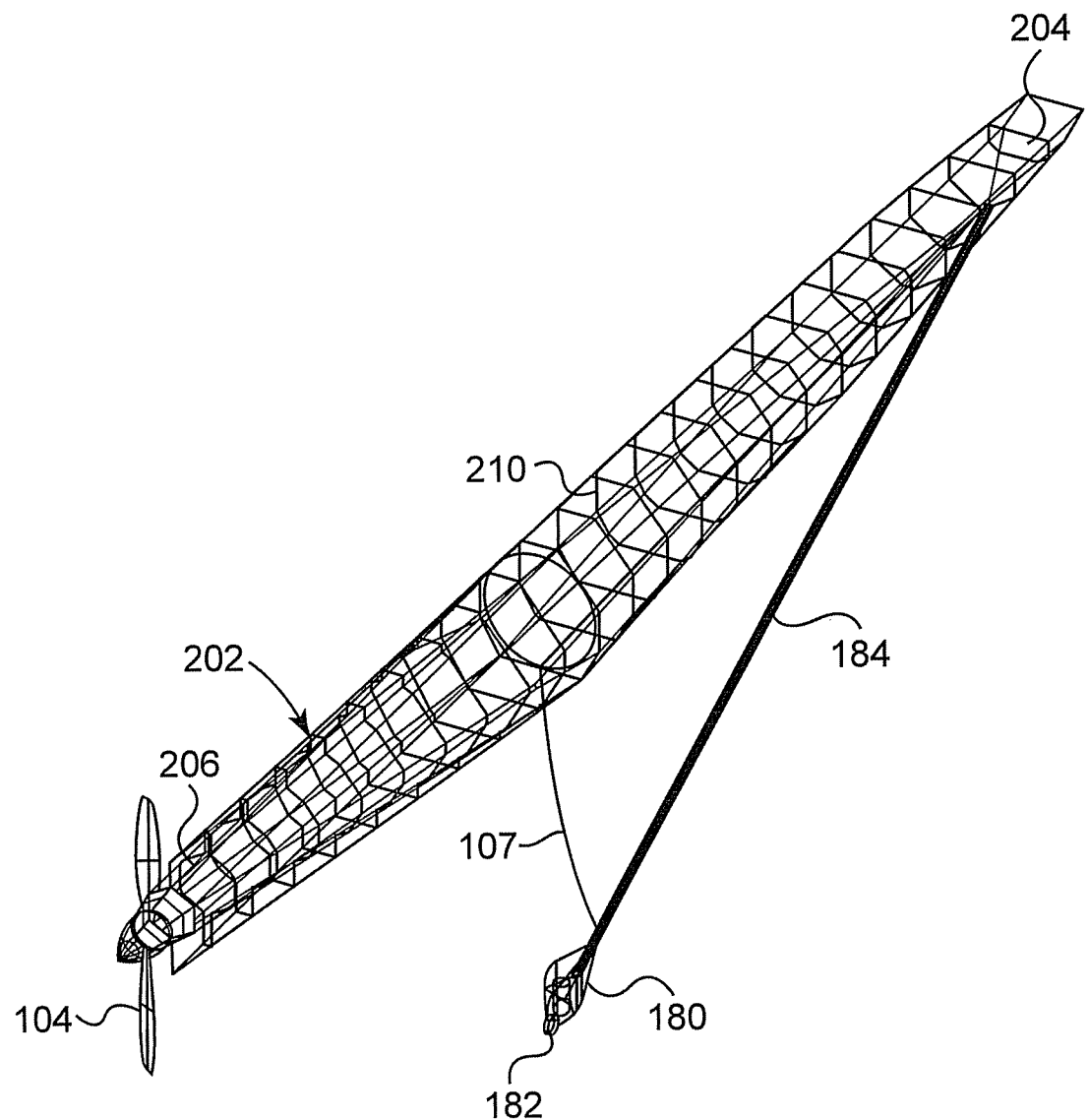
FIG. 12 is a perspective view of an internal structure of the long endurance powered aircraft shown in FIG. 11A illustrating the faceted fuselage having a varying cross-section along a length of the fuselage.

FIG. 12 is a perspective view of an internal structure of faceted fuselage 202 according to one embodiment. In one embodiment, faceted fuselage 202 includes a varying cross-section along its length between front 204 and rear 206. The varying cross-section of faceted fuselage 202 provides an internal volume configured to support payload such as fuel cells and observational equipment. As illustrated in FIG. 12, front 204 of faceted fuselage has a cross-sectional area different than rear 206 of faceted fuselage 202. Push-prop 104 is positioned at rear 206, and ventral fin spar 184 extends from a front 204 of faceted fuselage to support payload pod 180 in a deployed position. In one embodiment, faceted fuselage 202 includes one section 210 between front 204 and rear 206 that defines a substantially hexagonal perimeter shape. In other embodiments, faceted fuselage 202 includes one section 210 between front 204 and rear 206 that defines a cylindrical, elliptical, or other geometrical shape.

Figure 13A:
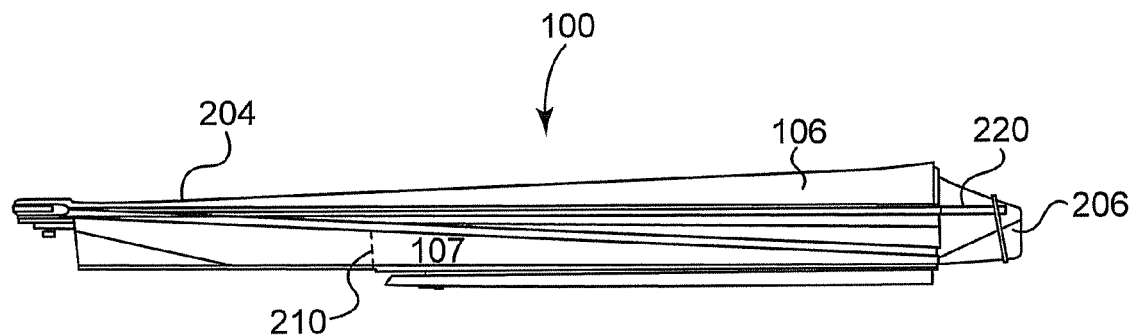
FIGS. 13A-13C are side views of the long endurance powered aircraft shown in FIG. 11A illustrating the wing folded in a manner suited for transportation of the aircraft.
Figure 13B:
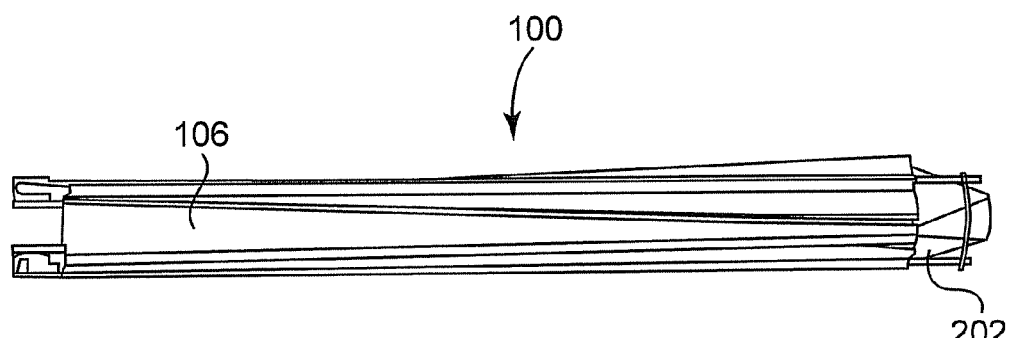
Figure 13C:
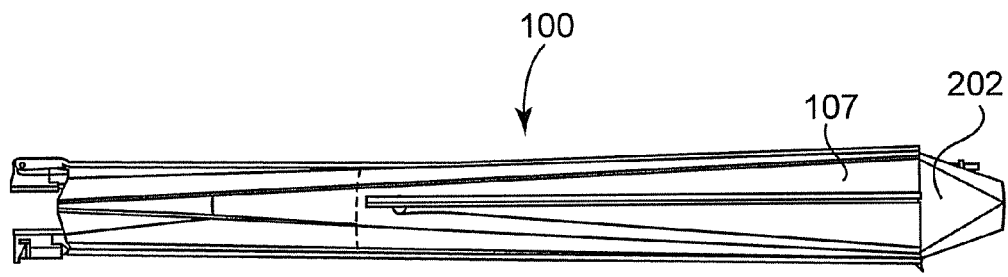

FIGS. 13A-13C are various embodiments of aircraft 100 collapsed/folded in a manner suited for transportation. When folded, one embodiment provides a handle 220 configured for carrying aircraft 100. A half-wedge of folded wing 106 is visible along a top portion of folded aircraft 100 in the side view of FIG. 13A. Ventral fin 107 is disposed at a lower portion of aircraft 100. Section 210 defines a location where the varying cross-section of faceted fuselage 202 defines a hexagon. Section 210 provides one location for positioning a high-pressure tank, or other nacelle tank. In one embodiment, front 204 of aircraft 100 includes a detachable sensor pod.

With reference to FIGS. 13B and 13C, wing 106 is folded flat alongside faceted fuselage 202. In one embodiment, ventral fin 107 is folded flat along faceted fuselage 202 and includes four 10 degree segments and two 5 degree segments.

In one embodiment, fin 107 is configured for gravity release/deployment. Ventral fin 107 is fabricated from energy collecting structures such as those described above in FIGS. 6-9. In one embodiment, ventral fin 107 includes solar cells on each exposed side surface. In one embodiment, ventral fin 107 is stiffer than wing 106 and is not retracted. In other embodiments, ventral fin 107 is configured to fold against faceted fuselage 202.

Figure 14:
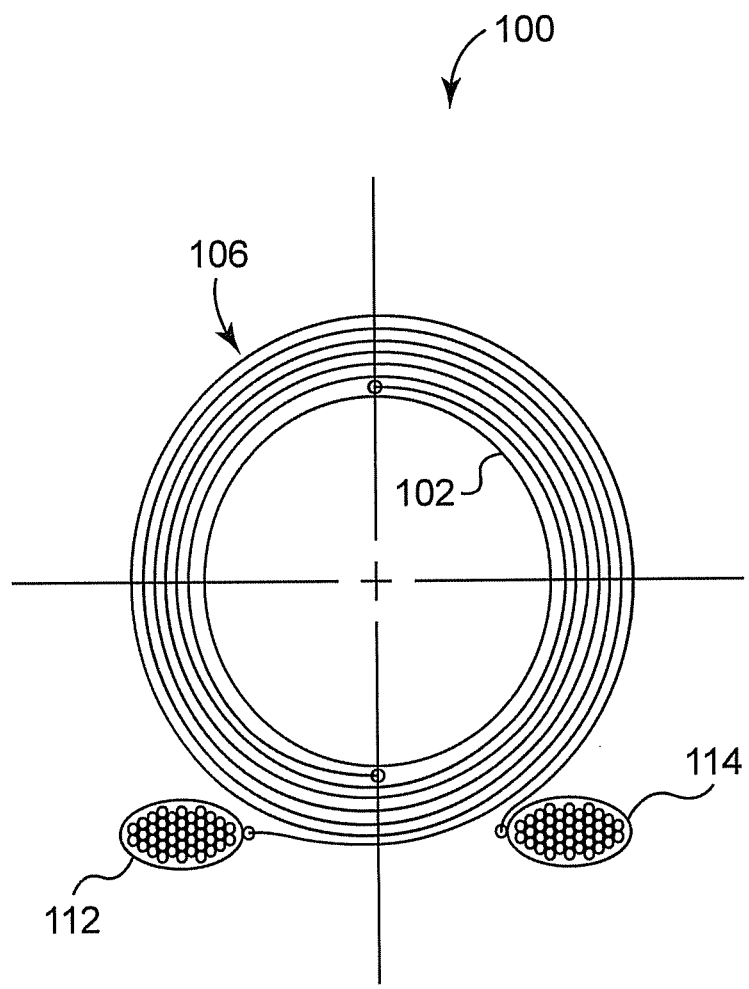
FIG. 14 is a cross-sectional view of a long endurance powered aircraft having a wing wrapped around a fuselage of the aircraft according to one embodiment.

FIG. 14 is a cross-sectional view of one embodiment of aircraft 100 including wing 106 wrapped around a circular fuselage 102. In one embodiment, central spar 102 is circular in cross-section and wing 106 is wound about an exterior portion of central spar 102. Spars 112, 114 of wing 106 are disposed along an exterior surface of the wound wing 106.

Figure 15:
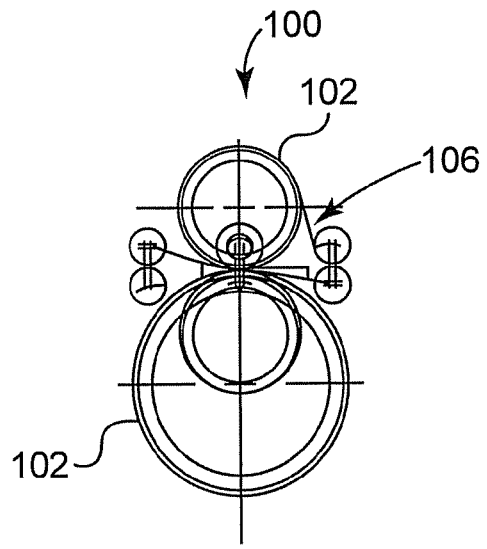
FIG. 15 is an end view of a long endurance powered aircraft having a fuselage folded along its length and a wing wrapped around the fuselage.

FIG. 15 is an end view of one embodiment of aircraft 100 folded at a midpoint of fuselage 102 and including parawing 107 wrapped around fuselage 102. With reference to FIG. 2, in one embodiment aircraft 100 is configured to fold along its longitudinal axis into two halves defining a first half of central spar 102 and a second half of central spar 102. Wing 106 is folded about folded sections of central spar 102.

Figure 16A:
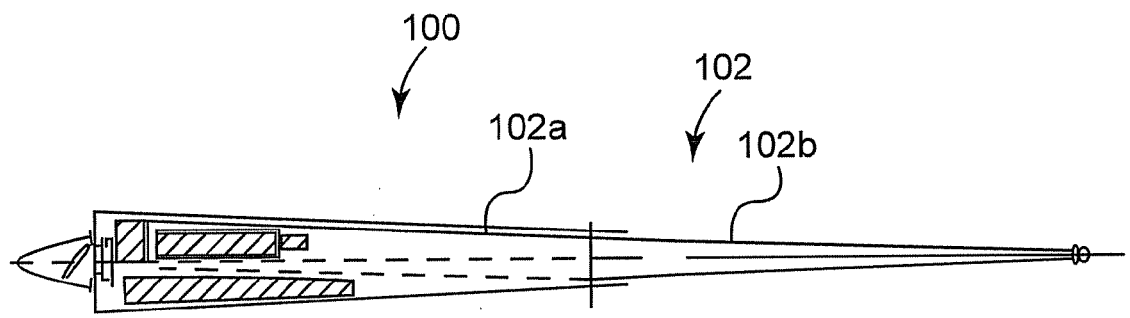
FIGS. 16A-16B are side views of a long endurance powered aircraft having an aircraft fuselage configured to collapse along its length in a telescoping manner according to one embodiment.
Figure 16B:
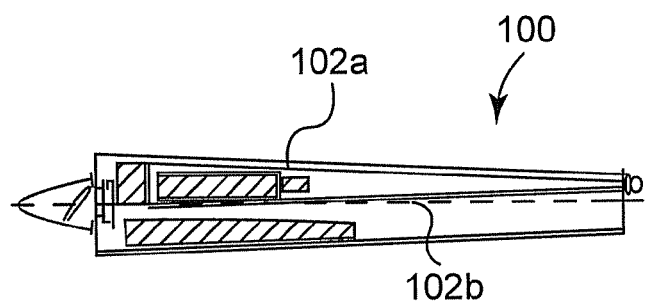

FIGS. 16A-16B illustrate a side view of one embodiment of aircraft 100 configured to collapse along its length in a telescoping manner. In one embodiment, central spar 102 includes a forward spar section 102a and a rearward spar section 102b. Rear spar section 102b is configured to telescope and slide within forward spar section 102a. FIG. 16B illustrates aircraft 100 collapsed to include rear spar 102b collapsed inside of forward spar 102a.

Figure 17:
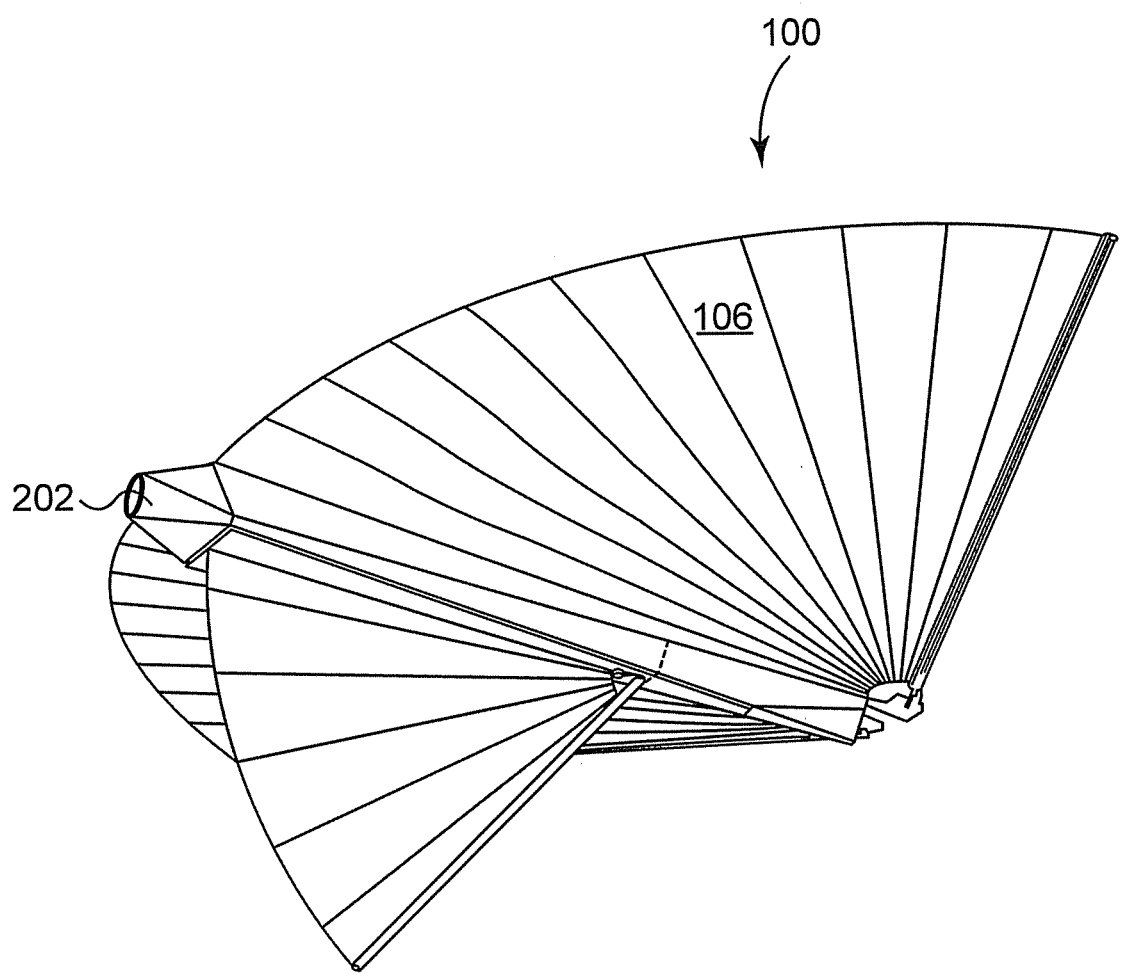
FIG. 17 is a perspective view of a long endurance powered aircraft including a fan-folded wing according to one embodiment.

FIG. 17 is a perspective view of a long endurance flight aircraft 100 including a fan-folded wing 106 according to one embodiment. Wing 106 is configured to unfold from a fan-folded configuration stowed alongside faceted fuselage 202. In one embodiment, solar cells 152 (FIG. 6) are crystalline solar cells having a higher solar collection efficiency, and a generally higher rigidity. Fan-folding wing 106 accommodates solar cells 152 that are less flexible than CIGS solar cells. FIG. 17 illustrates wing 106 unfolded at a sweep angle A (FIG. 2) of about 30 degrees from faceted fuselage 202.

Figures 18A, 18B:
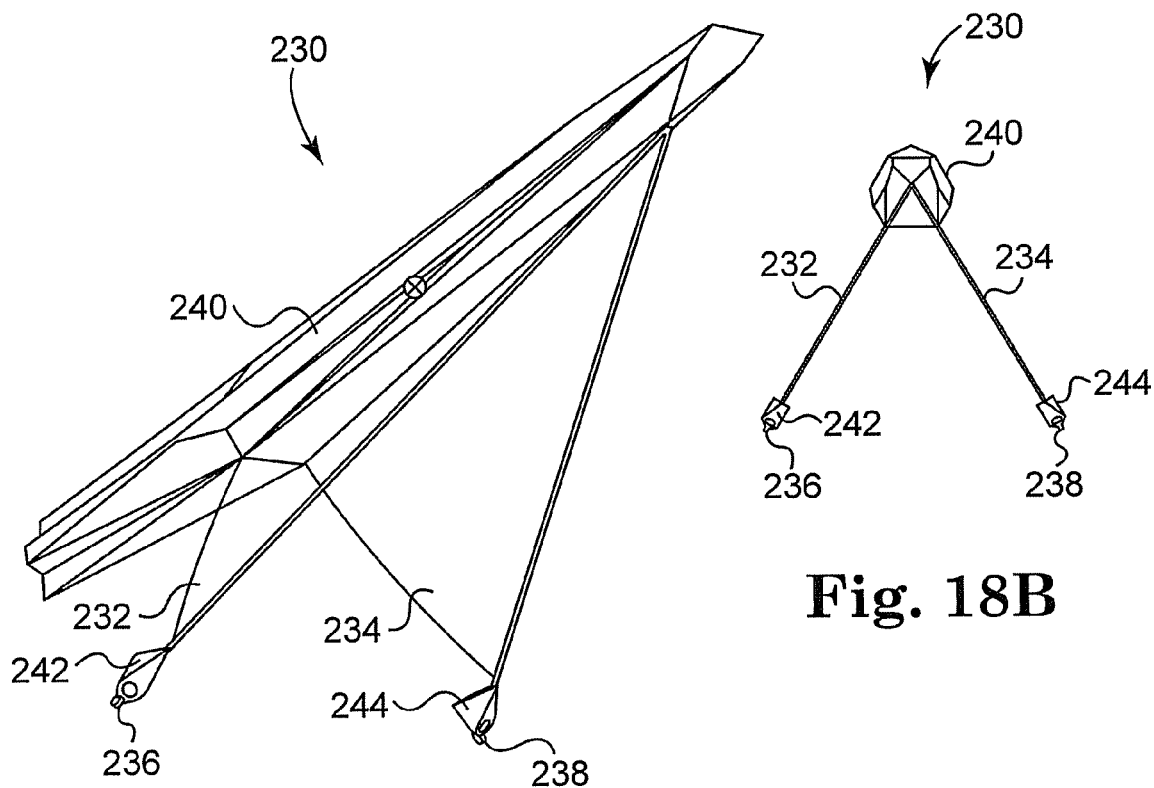
FIG. 18A is a perspective view.
FIG. 18B is a front view and FIG. 18C is a side view of a long endurance powered aircraft including two ventral fins each including landing gear according to one embodiment.
Figure 18C:
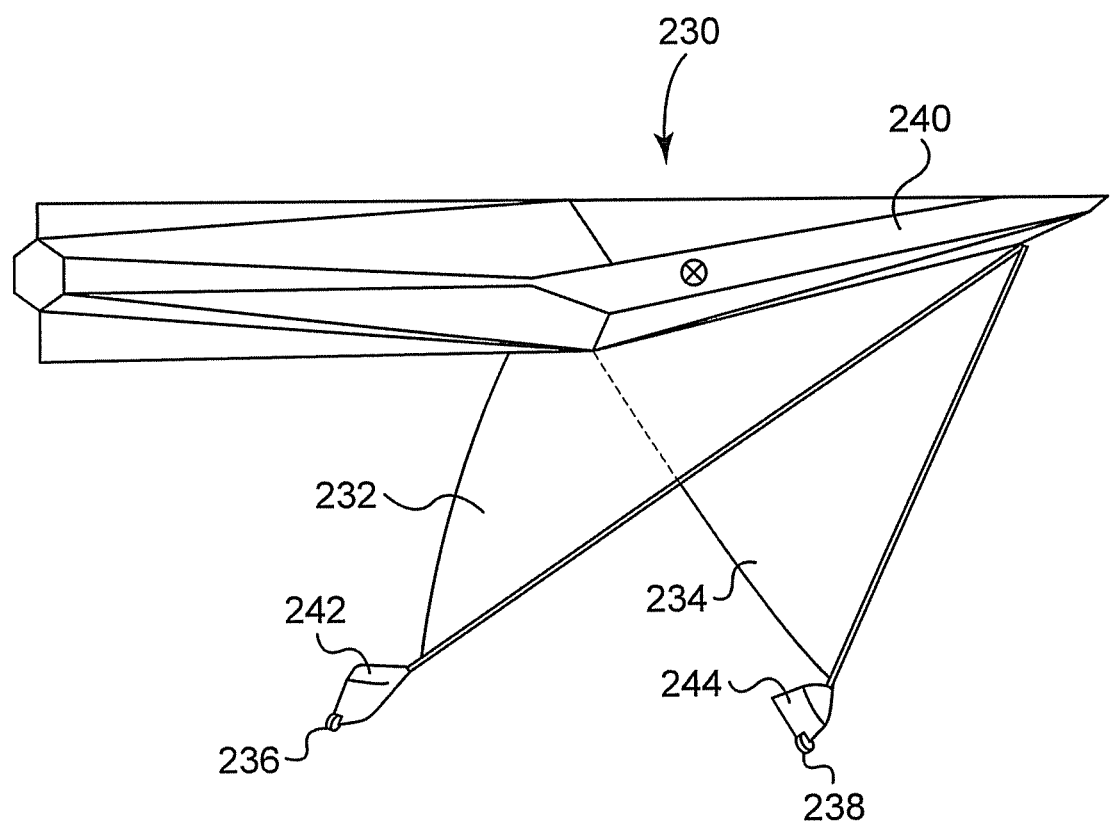

FIGS. 18A-18C illustrate another aircraft 230 including two ventral fins 232, 234 each including landing gear 236, 238, respectively, according to one embodiment. Aircraft 230 provides a pair of landing gear 236, 238 that provide two points of contact when landing, where landing gear 236, 238 are spread apart from each other and positioned aft of the center of gravity of the aircraft 230. With reference to FIG. 18B, in one embodiment spars of ventral fins 232, 234 are rotated in a plane determined by the angle of the edge of the folded stack of triangular panels of the fuselage (central spar) 240. The front view provided by FIG. 18B illustrates wing segments formed of six degree triangles lying on a five degree surface such that the angle of ventral fins 232, 234 are about 31 degrees on each side.

In one embodiment, wheels of landing gear 236, 238 are provided at about 12 feet apart for an exemplary 40-foot long aircraft and are located far enough back such that the propeller is unlikely to touch the ground during landing. In one embodiment, the spars of ventral fins 232, 234 will deflect as aircraft 230 lands, such that landing gear 236, 238 will move even farther back along aircraft 230 relative to the cg. In one embodiment, the stiffness of the spars of the ventral fins 232, 234 is selected such that the fins 232, 234 do not touch the ground during landing. In one embodiment, aircraft 230 includes a nose skid (not shown).

Embodiments of aircraft 230 include a pair of ventral fins 232, 234 that are each similar to the fin 107 described above. In this regard, embodiments of aircraft 230 provide for solar cells on each opposing surface of ventral fins 232, 234. In one embodiment, each ventral fin 232, 234 includes a payload pod 242, 244, similar to the payload pod 180 described above.

Figure 19A:
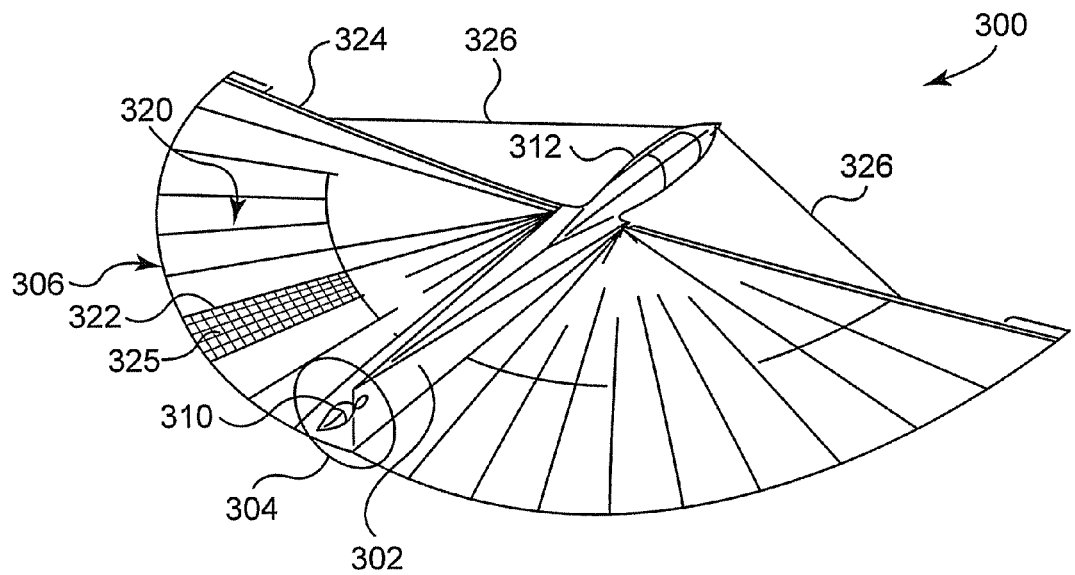
FIG. 19A is a perspective view of a long endurance powered aircraft according to another embodiment.
Figure 19B:
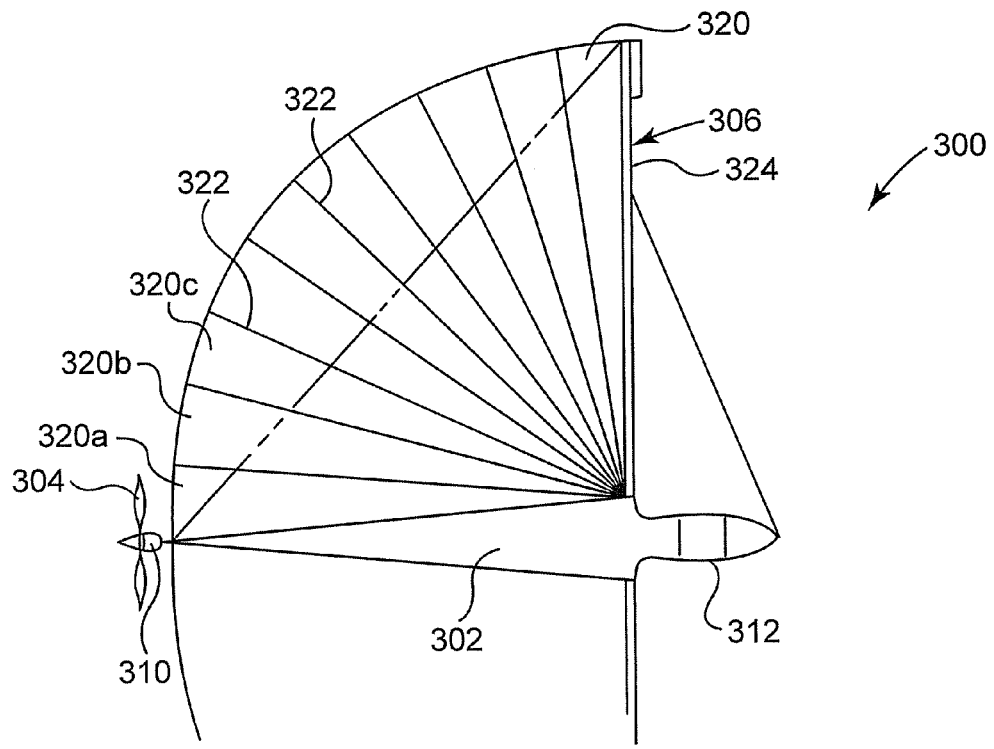
FIG. 19B is a top view of the long endurance powered aircraft shown in FIG. 19A.

FIG. 19A is a perspective view and FIG. 19B is a top view of a long endurance powered aircraft 300 according to another embodiment. Long endurance powered aircraft 300 ("aircraft 300") includes a central spar 302 or a fuselage 302, a propeller 304 coupled to fuselage 302, and a wing 306 coupled to fuselage 302. Wing 306 is similar to wing 106 described above, and includes a single thickness sheet having integral solar cells 325 (shown on only one panel for ease of illustration). Wing 306 is configured to fold against fuselage 302 to change the area of wing 306 (and/or for compact storage of aircraft 300) and selectively unfold from fuselage 302 to morph to selected flying configurations.

In one embodiment, fuselage 302 is shaped to be a tetrahedron having a length of about thirty feet and a height of about five feet with a tetrahedron angle of about 9.5 degrees. In one embodiment, propeller 304 is attached to an electric motor 310 that is in electrical communication with fuel cells maintained within a nose fairing 312. Propeller 304 and motor 310 are maintained in a motor pod that is about 2-4 feet long, and nose fairing 312 is between about 8-12 feet long such that these components are sized to fit inside a standard over-the-road trailer.

In one embodiment, wing 306 includes multiple segments 320 each separated by a batten 322, where a first segment 320a is connected to a bottom portion of the tetrahedron fuselage 302 and a last segment 320k is attached to a leading edge 324 of wing 306. In one embodiment, wing 306 includes a port side and a starboard side having about ten segments 320 provided on each side. In one embodiment, solar cells 325 are disposed along at least one surface of wing 306 between battens 322 (for example the top surface of wing 306 as depicted in FIG. 19A).

In one embodiment, solar cells 325 applied to wing segments 320 include a photovoltaic laminate of amorphous silicon solar cells adhered to a polymer film by an adhesive-sealant. In one embodiment, solar cells 325 provide the following exemplary performance at 1000 W/m2 at 25 degrees Celsius: 68 W maximum power; 16.5 V at maximum power; 4.1 A current at maximum power. Other suitable solar cells are also acceptable. One suitable photovoltaic laminate of solar cells 325 includes a high light-transmissive polymer of tetrafluoroethylene film such as Tefzel® having 11 triple joint amorphous silicon solar cells adhered to the polymer film with an ethylene co-polymer adhesive-sealant. One suitable photovoltaic laminate is identified as a UNI-Solar laminate PVL-68 available from United Solar Ovonics, Auburn Hills, Mich.

In one embodiment, cables 326 extend from nose fairing 312 to stiffen leading spars 324. During flight, aircraft 300 is banked by adjusting tension along cables 326. The cables 326 are also used to deploy the wings from their stored position, and to reduce the wing sweep angle. Similar cables along the trailing edges of the wings can increase the wing sweep angle, and pull the wings against the fuselage for stowage. The nose cables and/or tail cables are configured to provide complete control of the wing morphing.

FIG. 19B is a top view of wing 306. In one embodiment, leading edge 324 of wing 306 is a straight leading edge having no sweep and is configured to provide greater lift and use less power during night flight. In other embodiments, leading edge 324 of wing 306 is swept relative to central spar 302 (or fuselage 302) by an angle of between about 20-60 degrees. For example, wing 306 is swept at an angle of about 30 degrees from a reference line that is normal to fuselage 302 in a configuration that is aerodynamically stable and suited for conservation of power during flight. Wing 306 is similar to the flexible wings described throughout this disclosure, such that wing 306 likewise is configured to "billow" and capture air during flight to provide controlled lift for aircraft 300. In one embodiment, the billowing wing 306 curves leading edge spar 324 to provide a dihedral for wing 306 without angling spar 324. The wing angle selected for flight is adjusted to account for the amount of billowing. Those of skill in the art will recognize that other wing angles are selected to balance aerodynamic performance of aircraft 300 and that the payload carried by aircraft 300 is a function of the wing angle during flight.

In one embodiment, wing 306 includes an arced structure formed of flat battens 322 that are configured to connect the segments 320 together and stiffen wing 306 to minimize flapping and other undesirable aerodynamic instabilities. The arc formed by the flat battens 322 forms an approximate ninety-degree triangle that in one embodiment provides a 30.4 foot radius for the arc with a 30 degree sweep, which provides about 1000 square feet of surface area. In one embodiment a 37.2 foot radius for the arc with a 30 degree sweep provides about 1500 square feet of surface area. In one embodiment, a top portion of fuselage 302 is covered with solar cells similar to solar cells 152 described above in FIG. 6 such that the solar cells provide about 1600 square feet of energy collecting surface area.

Figure 19C:
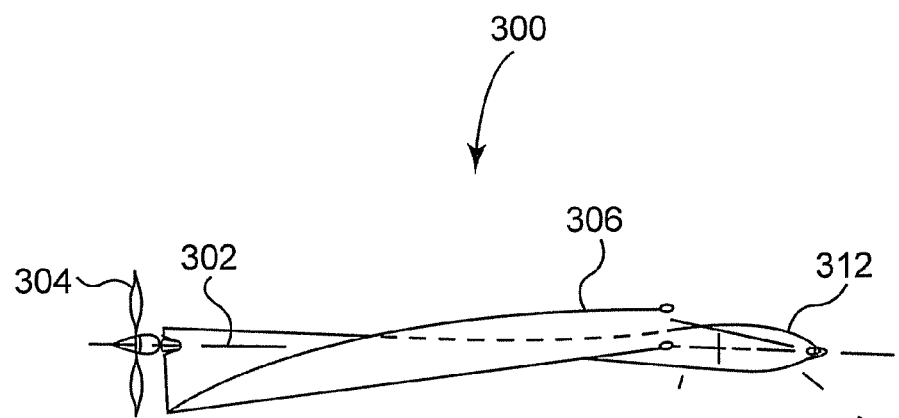
FIG. 19C is a side view of the long endurance powered aircraft shown in FIG. 19A.
Figure 19D:
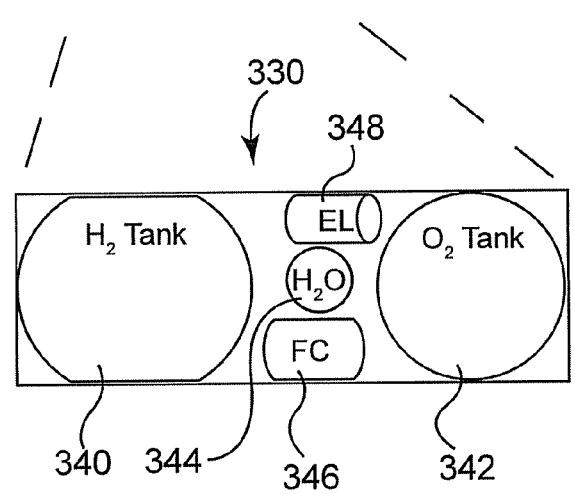
FIG. 19D is an enlarged view of an energy storage system stored in a nose cone of the long endurance powered aircraft shown in FIG. 19C.

FIG. 19C is a side view of powered aircraft 300 and FIG. 19D is an enlarged view of an energy storage system 330 enclosed within nose fairing 312. In one embodiment, nose fairing 312 is sized to provide aerodynamic balance for powered aircraft 300 and provide an anchor point for cables 326

(FIG. 19A). In one embodiment, energy storage system 330 includes a hydrogen tank 340 and an oxygen tank 342 each coupled to and on opposing sides of a water tank 344, a fuel cell 346, and an electrolyzer 348. A fuel cell stores one or more of its reactants externally.

In a system with solar cells and fuel cells, the solar cells convert sunlight into electrical energy during the day, and the electrolyzer 348 uses the excess power to break down water in water tank 344 into hydrogen (stored in hydrogen tank 340) and oxygen (stored in oxygen tank 342) to thereby store the energy as chemical energy. At night, the fuel cell 346 combines the hydrogen and oxygen in a controlled electrochemical reaction to produce electrical energy and a by-product of water, which is stored in water tank 344.

In the above embodiment, energy storage system 330 includes a regenerative fuel cell configured with separate electrochemical cells (e.g., fuel cell 346) to create electricity and electrolytic cells (e.g., electrolyzer 348) to electrolyze water. In one embodiment, a reversible, unitized regenerative fuel cell is configured to employ the same cells (electrochemical/electrolytic cells) to create electricity and electrolyze water.

In one embodiment, energy storage system 330 is disposed within nose fairing 312 or other portion of fuselage 302 and is configured to provide a relatively fixed center of mass for aircraft 300. In one embodiment, energy storage system 330 is disposed within fuselage 302 and is configured to provide a relatively adjustable center of mass for aircraft 300 as fuel cell 346 is charged/discharged.

In one embodiment, hydrogen tank 340 is a cylinder about 18 inches long and about 34 inches in diameter. In one embodiment, oxygen tank 342 is a sphere of about 34 inches in diameter. Water tank 344 is disposed at a center of mass between hydrogen tank 340 and oxygen tank 342 to provide powered aircraft 300 with a fixed center of mass. In one embodiment, fuel cell 346 is a 5 kW nominal fuel cell that is about thirteen inches long having an 11 inch diameter and a mass of about 12 kilograms. In one embodiment, electrolyzer 348 is a nominal 15 kW electrolyzer that is about 13 inches long with an 8.5 inch diameter and a mass of about 8.5 kilograms. These components are available from Lynntech, Inc., College Station, Tex. Other sizes and configurations for components of energy storage system 300 are also acceptable.

Powered aircraft 300 includes wing 306 and energy storage system 330 and is configured to operate at high altitude by day and a lower altitude by night. Some embodiments of powered aircraft 300 include cable-stiffened spars 326 extending between nose fairing 312 and a leading edge 324 of wing 306. Other embodiments of powered aircraft 300 include a canard for aerodynamic control. In general, powered aircraft 300 flies away from the sun at dawn and dusk to maximize solar input/power at low sun angles. Powered aircraft 300 is configured to fly at low trim velocity for a minimum power at night. The forward nose fairing 312 in front of the leading edge 324 of wing 306 provides aerodynamic balance. In one embodiment, segments 320 of wing 306 are configured to fold in a fan-like fashion one segment against the other and the collection of folded segments folds against the tetrahedron fuselage 302.

Figure 20:
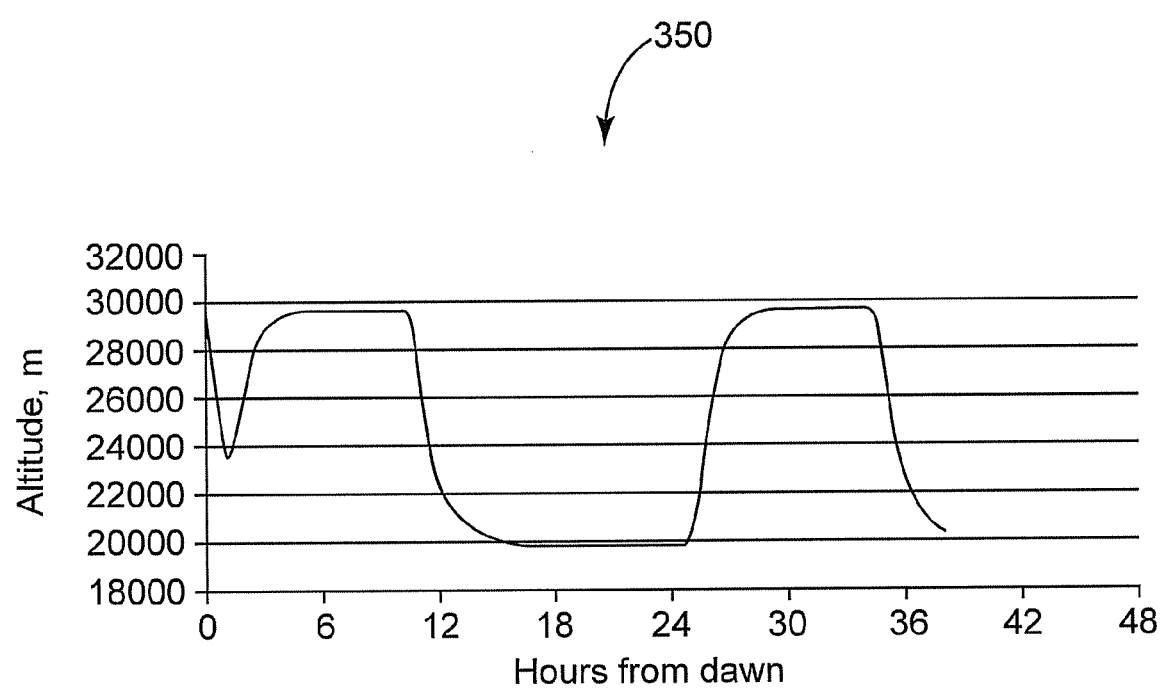
FIG. 20 is a diagrammatic view of a flight plan for a long endurance powered aircraft according to one embodiment.

FIG. 20 is a diagrammatic view of a flight plan 350 for a long endurance powered aircraft according to one embodiment. Flight plan 350 is a plot of altitude (meters) versus hours from dawn. Shortly after dawn, wing 106 of aircraft 100 is exposed to incident solar energy, and collects the solar energy to be employed to power propeller 104 enabling aircraft 100 to climb in altitude. During a time period of about 12 hours from dawn, aircraft 100 is powered for flight at an altitude of about 30,000 meters. As the sun sets, solar energy is not available and aircraft 100 begins flying in dusk conditions, decreasing altitude to conserve energy. Aircraft 100 cruises in a high-lift configuration during the low-power night operation, with as high an angle of attack as possible without danger of stalling, for example. From about 12 hours from dawn to about 24 hours from dawn, aircraft 100 glides down to an altitude of about 20,000 meters while utilizing a minimum of stored electrical energy. Thereafter, when sunlight is again incident onto fin 107 wing 106, aircraft converts the collected incident solar energy to electrical energy and climbs to an altitude of about 30,000 meters. Flight plan 350 provides one exemplary embodiment of long endurance flight for aircraft 100 oscillating between altitudes of approximately 20,000 and 30,000 meters and changing altitude in response to incident sunlight. Those of skill in the art will recognize that once aircraft 100 flies above the weather, there is no need for wing 106 to change its area or morph.

Figure 21:
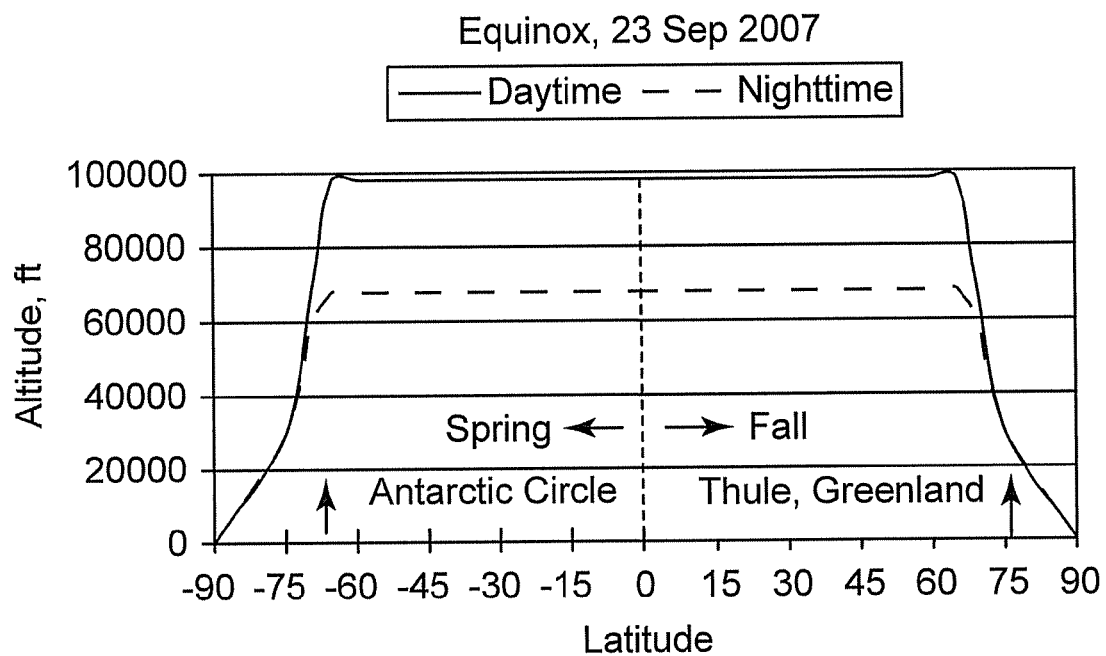
FIG. 21 is one flight altitude profile for a long endurance powered aircraft according to one embodiment.

FIG. 21 is one flight altitude profile for a long endurance powered aircraft according to a calculation for a flight of aircraft 100, 230, 300 during Equinox on Sep. 23, 2007. Daytime flight during both spring (southern latitudes) and fall (northern latitudes) is about 100,000 feet, and nighttime flight for these latitudes is about 65,000 feet.

Figure 22:
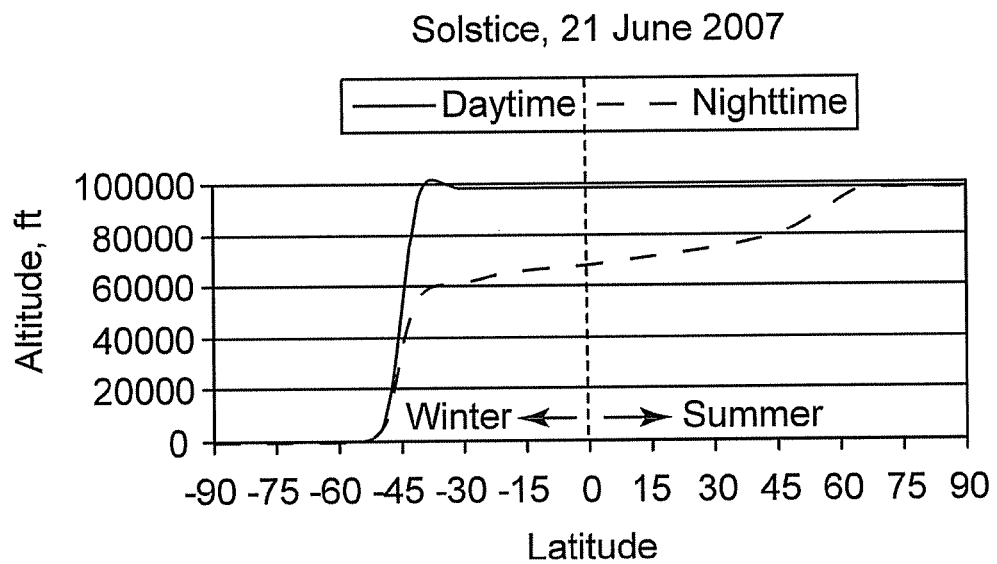
FIG. 22 is another flight altitude profile for a long endurance powered aircraft.

FIG. 22 is another flight altitude profile for a long endurance powered aircraft for an exemplary calculated Solstice flight on Jun. 21, 2007. In one embodiment, daytime flight occurs substantially in sun light conditions such that the aircraft altitude is about 70,000 feet, which is about 10,000 feet higher than a mean altitude for nighttime flight in the same conditions.

Figure 23:
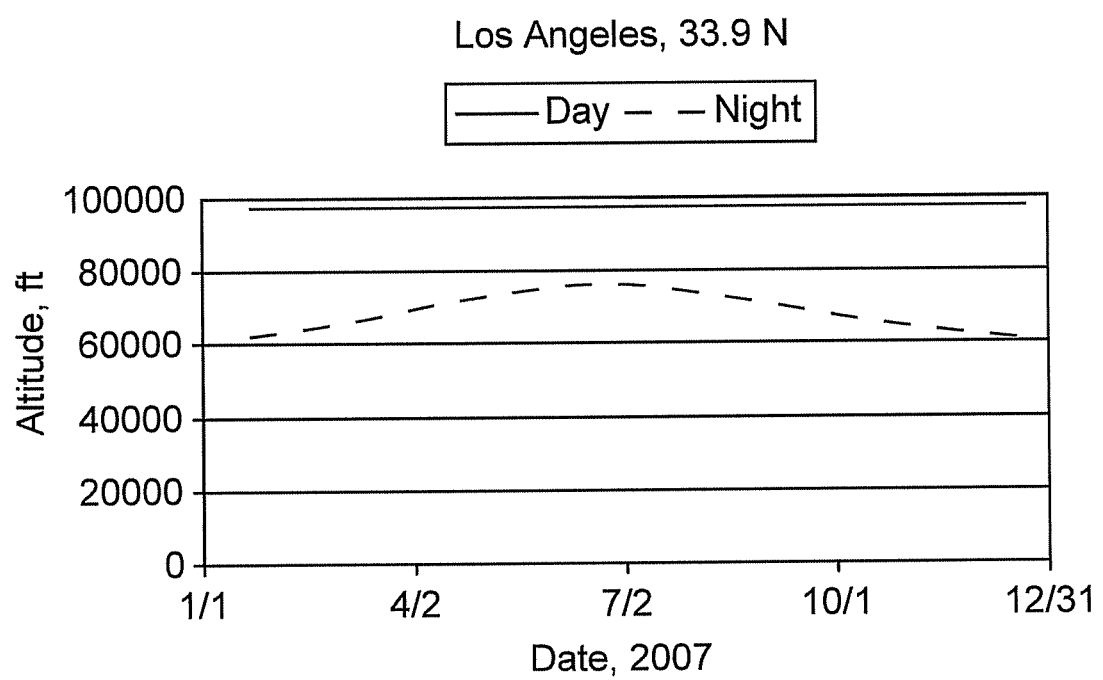
FIG. 23 is one flight altitude profile over the city of Los Angeles for a long endurance powered aircraft according to one embodiment.

FIG. 23 is one calculated altitude profile for flight by a long endurance powered aircraft over the city of Los Angeles according to one embodiment. FIG. 23 illustrates a calculation of aircraft performance plotting altitude of the aircraft as a function of the date. In this calculation, the aircraft 100, 230, 300 is flying at 33.9 degrees North latitude over Los Angeles, for example. The aircraft 100, 230 are configured to fly above 60,000 feet and have an endurance of greater than on the order of a calendar year, effectively providing what those in the art term as "perpetual" endurance.

Figure 24:
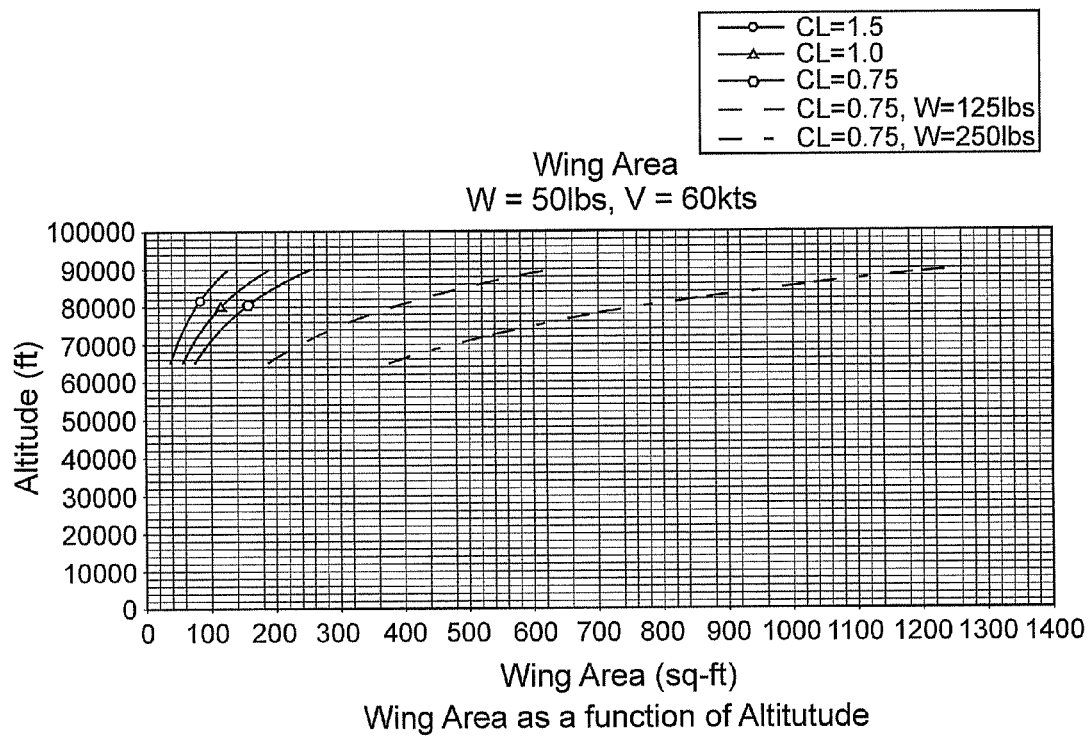
FIG. 24 is a plot of wing area as a function of altitude for a long endurance powered aircraft according to one embodiment.
Figure 25:
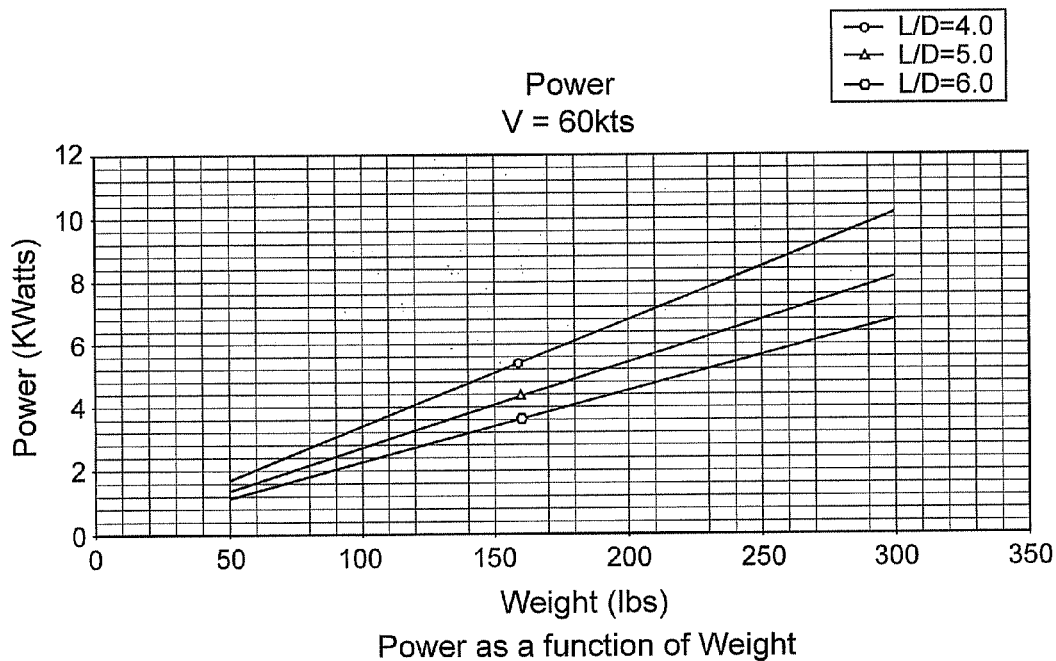
FIG. 25 is a plot of power as a function of weight for a long endurance powered aircraft according to one embodiment.
Figure 26:
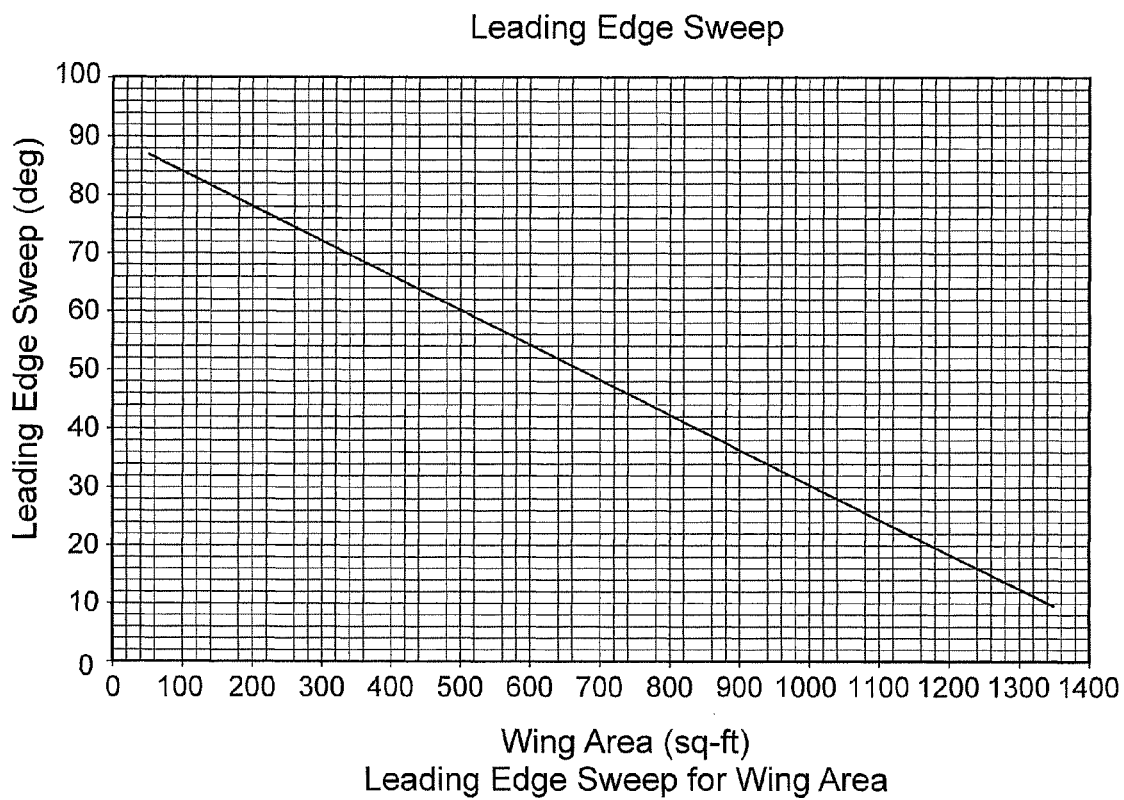
FIG. 26 is a plot of leading edge sweep as a function of wing area for a long endurance powered aircraft according to one embodiment.
Figure 27:
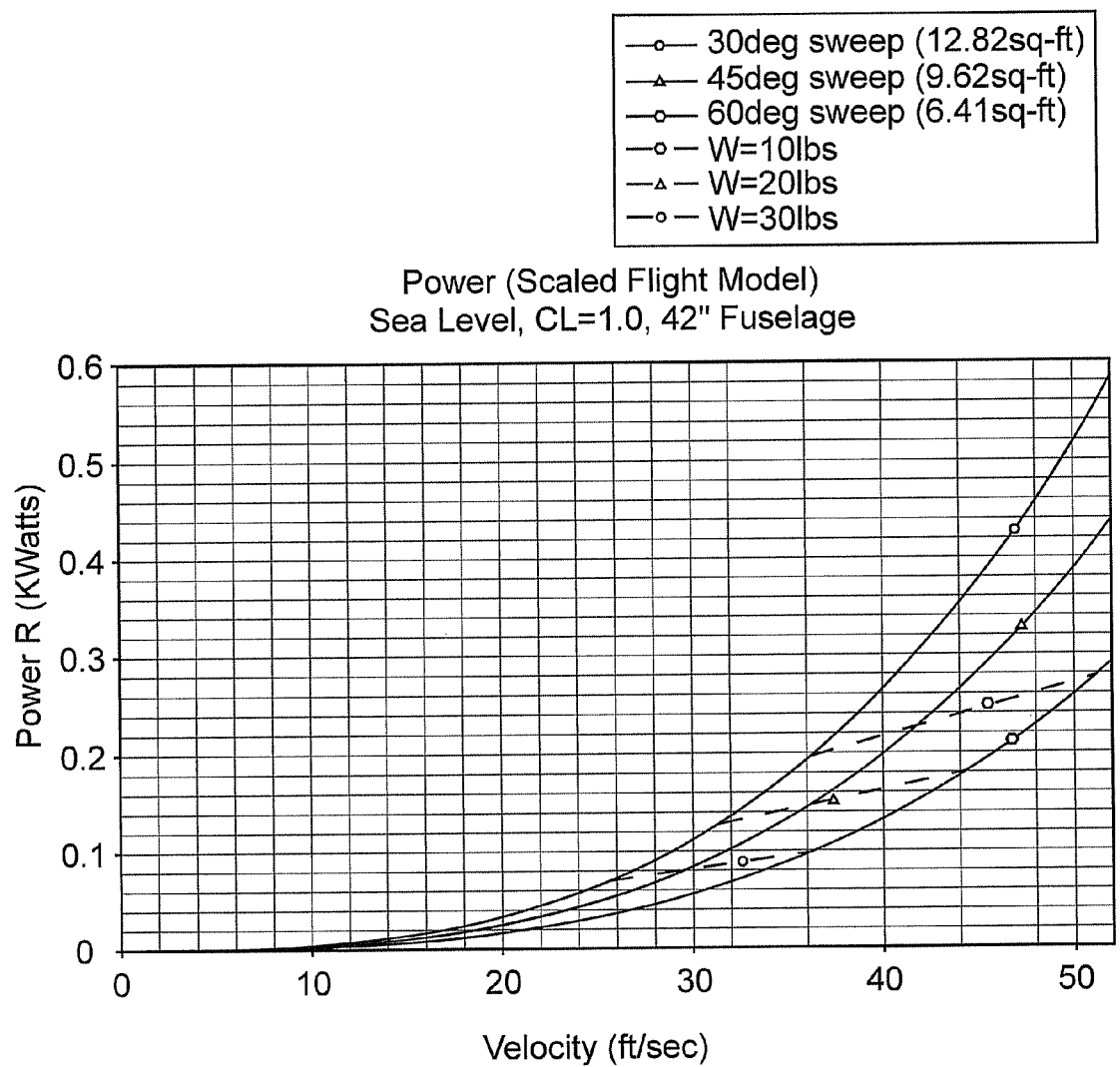
FIG. 27 is a plot of power as a function of weight for a long endurance powered aircraft according to one embodiment.

FIG. 24 is a plot of wing area as a function of altitude, FIG. 25 is a plot of power as a function of weight, FIG. 26 is a plot of leading edge sweep as a function of wing area, and FIG. 27 is a plot of power as a function of weight for a long endurance powered aircraft according to embodiments.

Embodiments of the exemplary aircraft described above include regenerative fuel cells (600 W·hr/kg), based on the Lynntech design to provide the power for continuous operation. The $H_2$ and $O_2$ storage tanks are disposed in central spar, for example water is stored forward in an insulated tank of central spar 102, and aft around the motor for cooling. Other embodiments include lithium ion or lithium sulfur batteries for the energy storage system within central spar 102. One suitable lithium sulfur battery is available from Sion Power, Tucson, Ariz.

The horizontal wing solar cells collect solar energy and are configured to convert the collected solar energy to electrical energy to provide the aircraft with high power at noon, and the ventral fin 107 vertical solar cells are configured to convert collected solar energy to electrical energy and provide the aircraft with high power near dawn or dusk. The large wing area also allows ample room for extra cells for redundancy as described above in FIGS. 19A-19B.

In one embodiment, the propeller includes a brushless DC motor and high-altitude propeller configured to drive the long endurance powered aircraft over 100 ft/sec to overcome wind, allowing it to climb and move upwind over the target area during the day, and hold position at night. Other propeller configurations are also acceptable.

In one embodiment, the propeller is a thrust vector motor/propeller that assists attitude control of aircraft, and the ventral fin provides lateral stability, as well as doubling as vertical solar cell area. Roll control can also be provided by differential reefing of opposing sides of wing.

In one embodiment, aircraft is stowed and launched by another powered aircraft and climbs to altitude in less than an hour. Alternatively, aircraft is launched by balloon or catapult and can be on station in 2-3 hours. To end its mission, the vehicle flies back to the recovery base autonomously from its on-board computer, or at the direction of a remote pilot. Aircraft can glide nearly 1000 km (600 ml) on just 5 kW·hr of stored energy.

Aircraft is self-deploying by unfolding wing from spar. Torques developed by the center body and two deployment rods attached to the side spars can reef the side wings individually for roll control. In one embodiment, forward and aft water tanks are filled differentially to control the center of gravity for pitch stability, and wing has varying sweep for different flight conditions. Aircraft will fly with forward cg in daytime for higher speed, and aft cg at night for higher lift.

Models of the aircraft described above were fabricated and evaluated in a subsonic wind tunnel.

Figure 28:
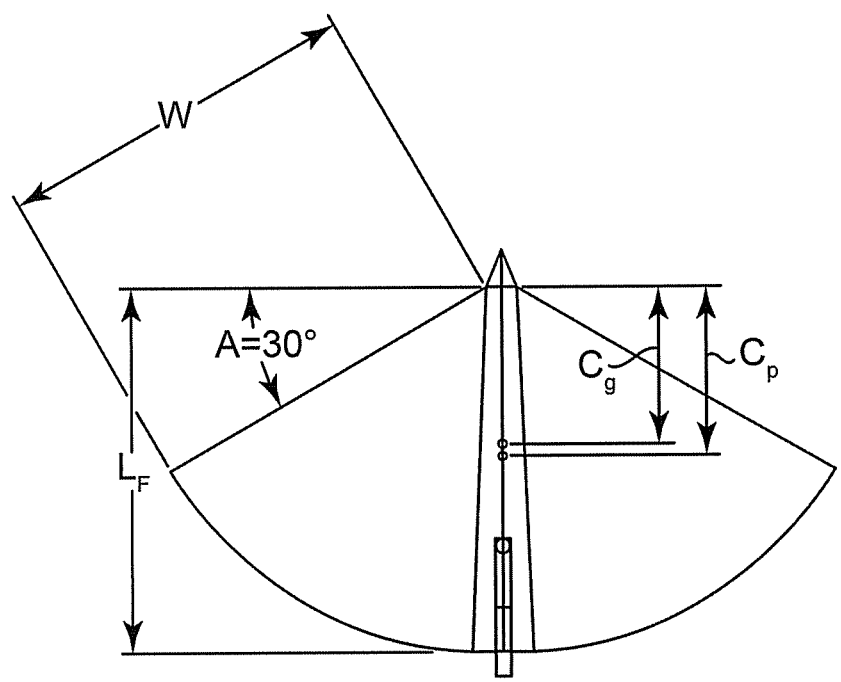
FIG. 28 and FIG. 29 are diagrams of a wind tunnel model of an aircraft including a swept wing.

FIG. 28 is a diagram of an aircraft wind tunnel model having a 30 degree wing sweep angle. With additional reference to FIG. 2A, the model includes a leading spar length W of 24 inches and a wing sweep angle of 30 degrees. The center of gravity Cg was determined to be 10 inches from the leading edge of the wing, and the center of pressure Cp was determined to be about 11 inches from the leading edge of the wing.

Figure 29:
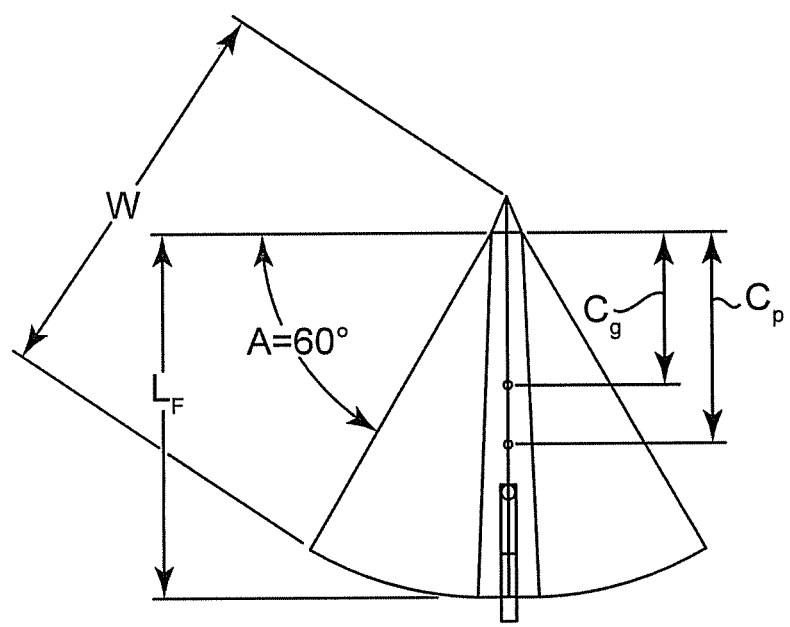

FIG. 29 is a diagram of an aircraft wind tunnel model having a 60 degree wing sweep angle, with the spar length W of 24 inches. The center of gravity Cg is fixed at about 10 inches from the leading edge of the wing and the center of pressure Cp for this model was determined to be located at about 14 inches from the leading edge of the wing.

Wind tunnel testing was conducted at a Reynolds number of about 550,000 and compared to established, existing wind tunnel data for flat delta wing models. A close correlation was achieved between the models shown in FIGS. 28 and 29 and the established wind tunnel data for the flat delta wing models.

Figure 30:
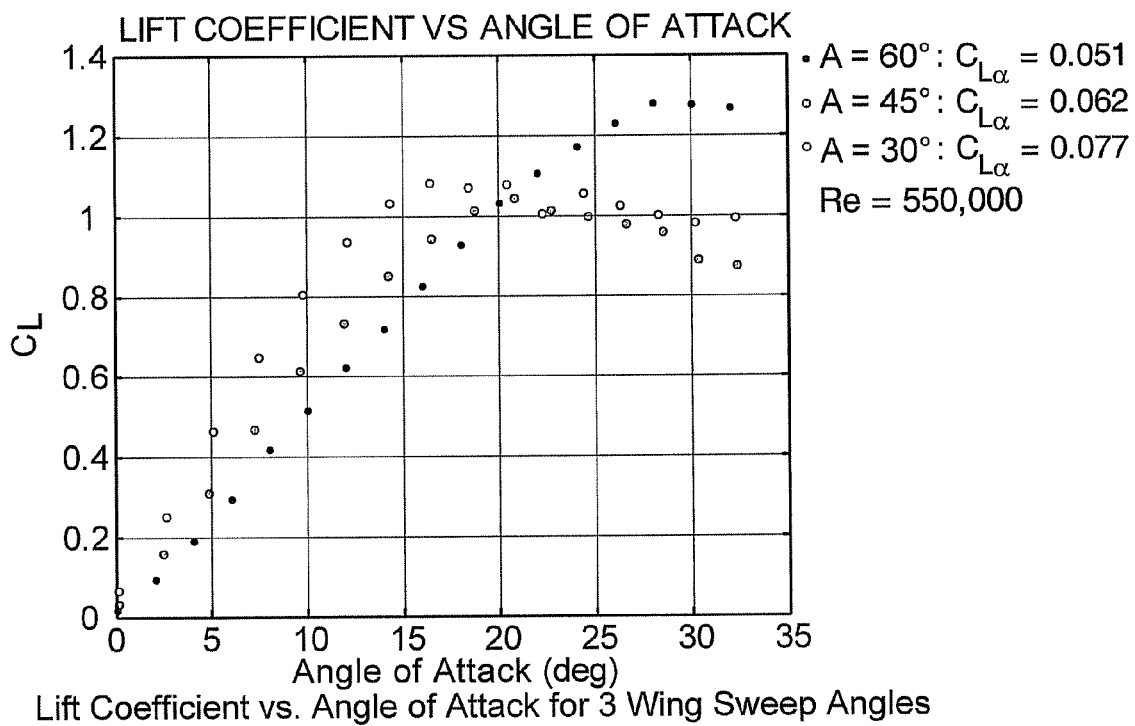
FIG. 30 is a graph of lift coefficient plotted against angle of attack for three wing sweep angles according to one embodiment.
Figure 31:
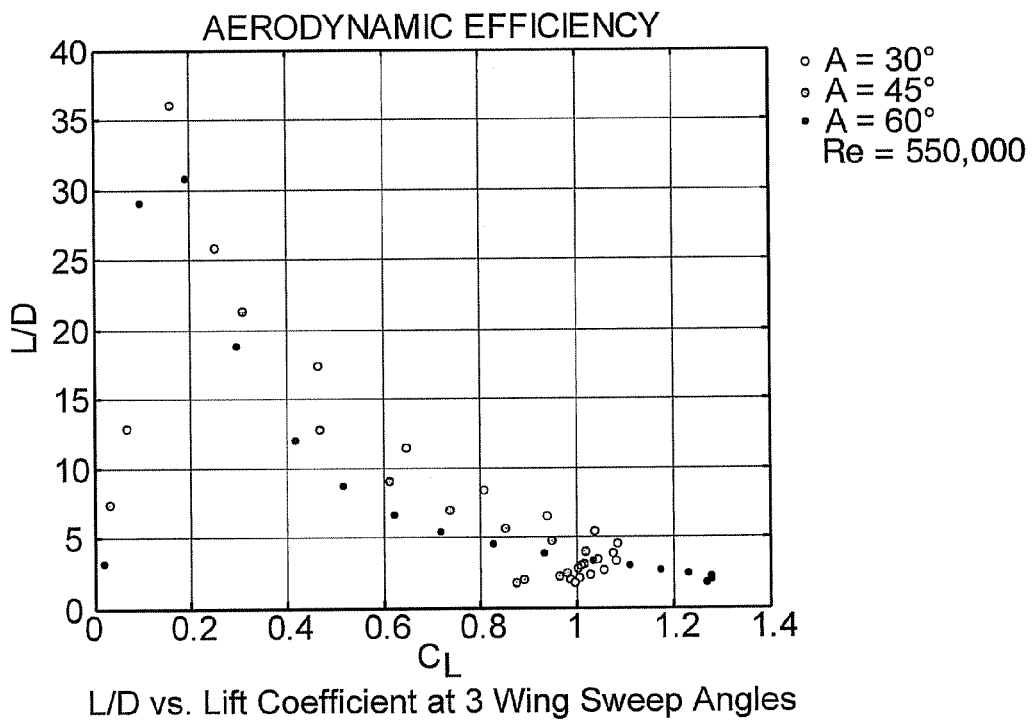
FIG. 31 is a graph of the lift-to-drag ratio plotted against lift coefficient for an aircraft having different wing sweep angles.

FIG. 30 is a graph of lift coefficient plotted against angle of attack for wing sweep angles of 30 degrees, 45 degrees, and 60 degrees. FIG. 31 is a graph of lift-to-drag ratio plotted against lift coefficient for the three wing sweep angles of 30 degrees, 45 degrees, and 60 degrees. There is a relatively rapid increase in the lift coefficient as a function of angle of attack for delta wing-style of aircraft.

Figure 32:
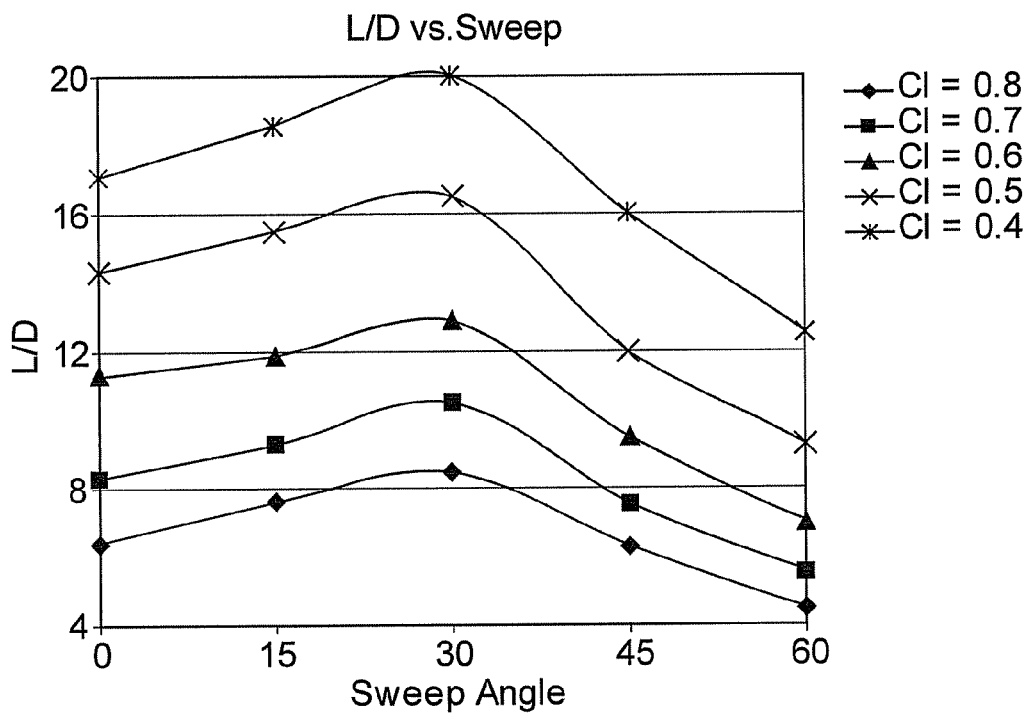
FIG. 32 is a graph of lift-to-drag ratio plotted against sweep angle for various lift coefficients.

FIG. 32 is a graph of lift-to-drag ratio plotted against sweep angle for various lift coefficients. The values of L/D increase with lower lift coefficients, and increase with sweep angle to a peak at about 30 degrees, and then decrease. The pitching moments about the mean aerodynamic chord, $C_{mac}$, increase at lower sweep angles, but are quite manageable at a 30-degree sweep and $C_L$=0.5, which is close to the optimum.

Figure 33:
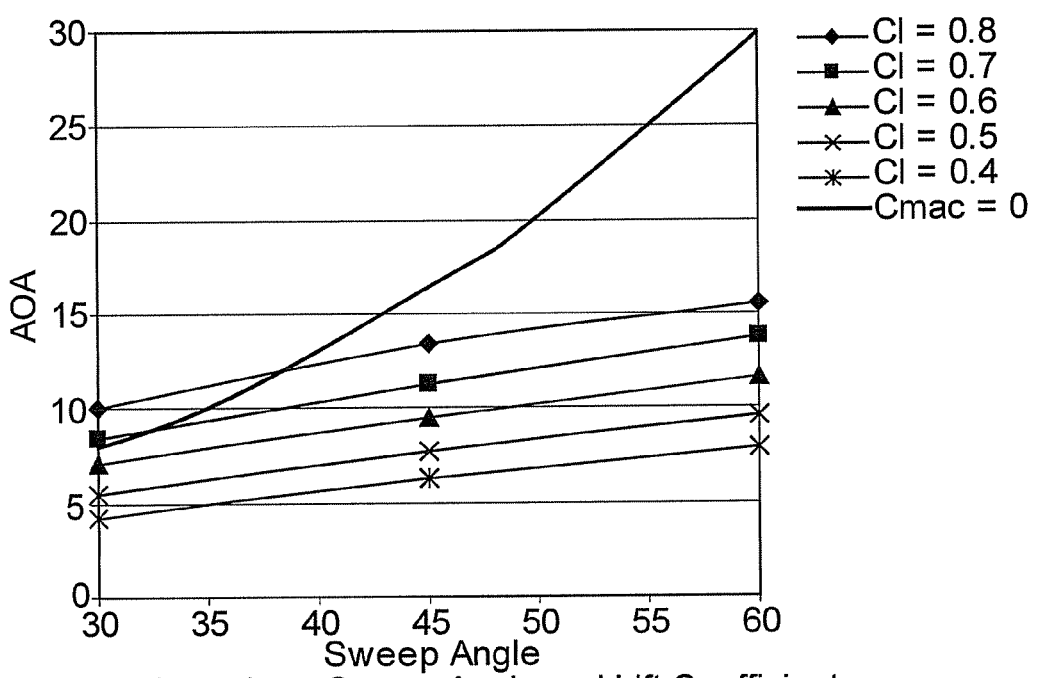
FIG. 33 is a graph of angle of attack plotted against sweep angle for various lift coefficients.

FIG. 33 is a graph of angle of attack plotted against sweep angle. The pitching moment about the mean aerodynamic chord, $C_{mac}$, provides a limiting maximum angle of attack for the stability of delta wing-style of aircraft. For this reason, it is desirable to choose a sweep angle near 30 degrees and angles of attack of less than about 10 degrees for the long endurance aircraft described herein.

Figure 34:
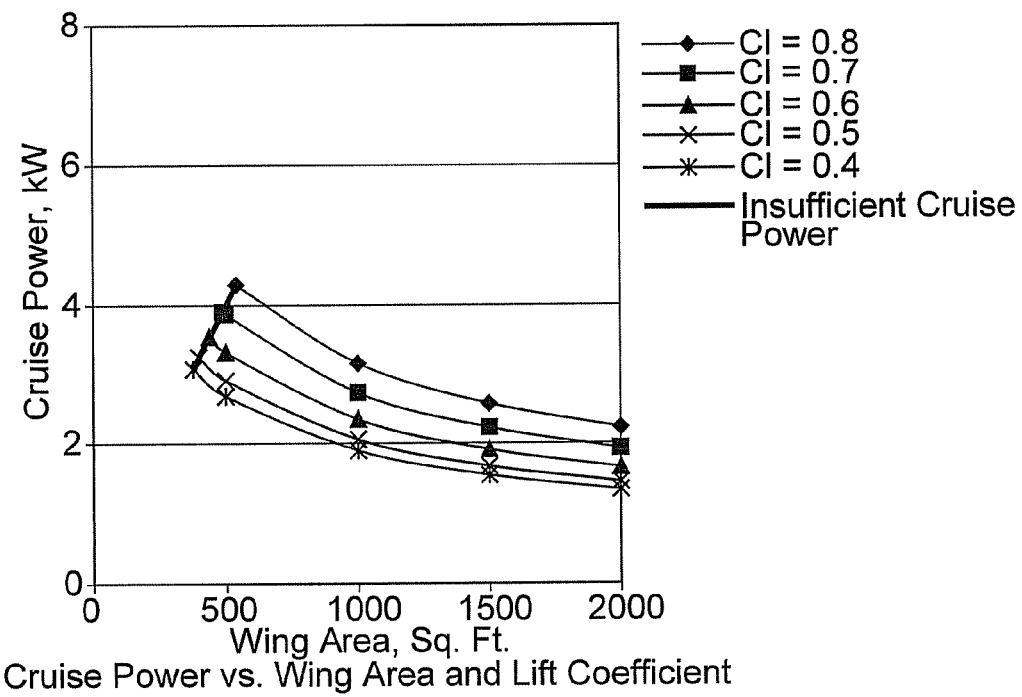
FIG. 34 is a graph of cruise power plotted against wing area for various lift coefficients.

FIG. 34 is a graph of cruise power plotted against wing area. The vehicle size is generally limited by the wing area. The lift coefficient for lifting a vehicle of a given weight is calculated and then a suitable wing area is calculated based on the vehicle size. In general, lower values of wing area and higher lift coefficients translate to the propeller using more power in flying the aircraft. In one embodiment, aircraft having a 250 pound vehicle weight are calculated to have an optimum wing area of between about 1000-1500 square feet.

Figure 35A:
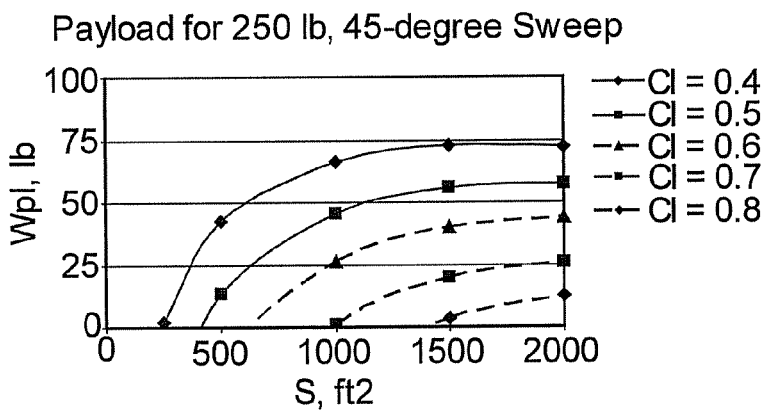
FIGS. 35A and 35B are graphs of payload plotted against wing area for various lift coefficients.
Figure 35B:
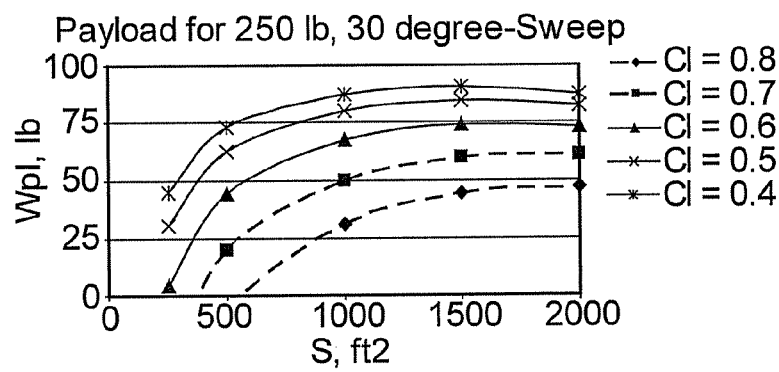

FIGS. 35A and 35B are graphs of payload weight plotted against wing area for various wing sweep angles. Using a baseline vehicle weight of 250 pounds, a range of possible payload weights are estimated based on calculated values of payload weights. It is desirable to have a payload of about 50 pounds. FIG. 35A illustrates that the desired 50 pound payload for a 250 pound aircraft with a 45 degree wing sweep is achievable, but with higher values of lift coefficient. FIG. 35B illustrates that the desired 50 pound payload for a 250 pound aircraft is best achieved with a 30 degree wing sweep having associated lower values of lift coefficient. As a consequence, the optimum calculated wing area appears to be 1000-1500 square feet for an aircraft having a baseline weight of 250 pounds and a payload of 50 pounds.

Figure 36:
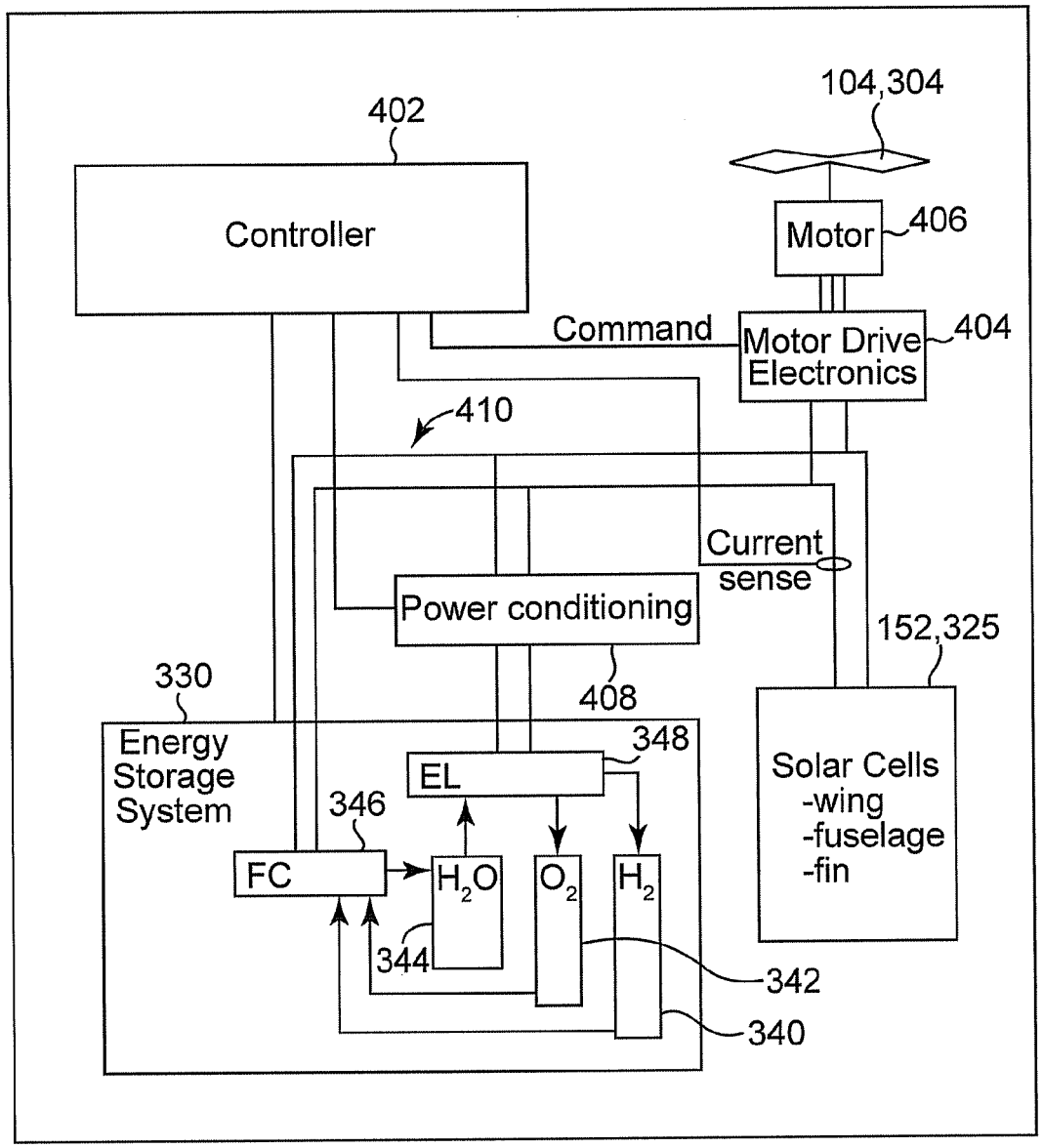
FIG. 36 is a block diagram of a propulsion system for aircraft according to embodiments.

FIG. 36 is a block diagram of a propulsion system 400 for aircraft according to embodiments. Propulsion system 400 includes a controller 402 electrically coupled with motor drive electronics 404 connected to a motor 406 that drives propeller 104/304, and a power conditioning device 408 electrically coupled with electrolyzer 348 of energy storage system 330. In one embodiment, energy storage system 330 includes a regenerative fuel cell having separate electrochemical cells (e.g., fuel cell 346) configured to create electricity and electrolytic cells (e.g., electrolyzer 348) configured to recharge the system by electrolysis. In one embodiment, a reversible, unitized regenerative fuel cell includes the same electrochemical/electrolytic cells to create electricity and perform electrolysis.

In one embodiment, solar cells 152, 325 collect incident solar energy and convert the collected incident solar energy to electricity for powering the above-described aircraft during daylight flight. In one embodiment, controller 402 is configured to sense an amount of electrical current that is being provided by solar cells 152, 325. During daylight flight when the aircraft is powered by the electricity converted from collected solar energy by the solar cells 152, 325, the electrolytic cells (e.g., electrolyzer 348) employ excess electrical energy to recharge the system by electrolyzing water in water tank 344 into hydrogen and oxygen gases, which are thereafter stored under pressure in hydrogen tank 340 and oxygen tank 342, respectively, within the fuselage. When available solar energy is at a minimum (e.g., nighttime flight), the regenerative fuel cell (e.g., fuel cell 346) reacts hydrogen from hydrogen tank 340 and oxygen from oxygen tank 342 together in a controlled electrochemical reaction that produces water (which is stored in water tank 344) and electricity for powering the aircraft. In one embodiment, energy storage system 330 is a "closed system" in which the reactants are recycled each day.

Controller 402 is configured to utilize electricity provided by energy storage system 330 to selectively drive propeller 104, 304. In one embodiment, a DC power bus 410 is coupled between controller 402, solar cells 152, 325, energy storage system 330, and motor drive electronics 404 to receive and distribute power throughout system 400. Electronics 304 and motor 406 include any suitable electronics or electric motors.

Embodiments of aircraft include sensor packages for particular missions, and integral autonomous control capability. Aircraft is configured to be commanded to fly back to a landing site for recovery, re-fitted with alternative sensor packages, and re-flown on similar or quite different missions, with short turnaround times. Other embodiments of Aircraft are configured for microwave relays for cell phones and other wireless communication links.

Although specific embodiments have been illustrated and described, it will be appreciated by those of ordinary skill in the art that a variety of alternate and/or equivalent implementations may be substituted for the specific embodiments shown and described without departing from the scope of the disclosure. This application is intended to cover any adaptations or variations of the specific embodiments of long endurance aircraft described herein. Therefore, it is intended that this invention be limited only by the claims and the equivalents thereof.

What is claimed is:

1. A long endurance powered heavier-than-air aircraft comprising:
    an energy storage system functioning as a fuselage;
    an electric motor and a propeller coupled to the energy storage system;
    a non-inflatable parawing coupled to the energy storage system, the parawing comprising:
        a leading edge spar,
        multiple battens including a first batten and a last batten, and
        multiple wing segments including a first wing segment coupled between the energy storage system and the first batten and a last wing segment coupled between the last batten and the leading edge spar, each wing segment formed of a flexible integrated solid energy cell sheet including flexible solar cells integrated with a flexible thin film foil, the flexible integrated solid energy cell sheets of the multiple segments structured to aerodynamically support the aircraft during flight, the parawing having an adjustable wing surface area, the flexible solar cells configured to collect incident solar energy and convert the collected incident solar energy to electrical energy for powering the aircraft during daylight flight; and
    a parawing morphing system to deploy and control the adjustable wing surface area and wing flexibility;
    the energy storage system configured to convert excess electrical energy converted from collected incident solar energy to chemical energy, store the chemical energy in the energy storage system, and convert the stored chemical energy to electrical energy for powering the aircraft during night flight.

2. The long endurance powered aircraft of claim 1, wherein the energy storage system comprises a fuel cell coupled to a water tank disposed between and coupled to a hydrogen tank and an oxygen tank, the water tank configured to selectively adjust the aircraft's center of mass as the fuel cell is charged/discharged, wherein the energy storage system forms at least one of the water tank, the hydrogen tank, and the oxygen tank.

3. The long endurance powered aircraft of claim 1, wherein an exterior surface of the energy storage system comprises additional solar cells.

4. The long endurance powered aircraft of claim 3, wherein the wing and the energy storage system combine to comprise a solar cell area of between about 800-2000 square feet.

5. The long endurance powered aircraft of claim 1, wherein the flexible solar cells are configured to collect incident solar energy which is converted to electrical energy, the electrical energy employed for powering the aircraft during daylight flight at a first altitude and the excess electrical energy stored in the energy storage system is employed for powering the aircraft during night flight at a second altitude that is lower than the first altitude.

6. The long endurance powered aircraft of claim 1, wherein the flexible integrated solid energy cell sheet comprises an entire thickness of the parawing.

7. The long endurance powered aircraft of claim 1, wherein the flexible integrated solid energy cell sheet comprises flexible infrared cells integrated with the flexible thin film foil opposite the flexible solar cells.

8. A long endurance powered heavier-than-air aircraft comprising:
    an energy storage system functioning as a fuselage;
    an electric motor and a propeller coupled to the energy storage system;
    a thin film folding non-inflatable parawing coupled to the energy storage system, the thin film folding parawing configured to fold to low aspect ratios for turbulence-safe takeoff and landing and to unfold to high aspect ratios for efficient flight above controlled airspace, the thin film folding parawing comprising:
        a leading edge spar,
        multiple battens including a first batten and a last batten, and
        multiple wing segments including a first wing segment coupled between the energy storage system and the first batten and a last wing segment coupled between the last batten and the leading edge spar, each wing segment formed of a flexible integrated solid energy cell sheet including flexible solar cells integrated with a flexible thin film foil, the flexible integrated solid energy cell sheets of the multiple segments structured to aerodynamically support the aircraft during flight;
    a deployable thin film ventral fin parawing for aerodynamic control; and
    an auxiliary thin film capacitor storage in the thin film folding parawing and the thin film ventral fin parawing.

9. The long endurance powered aircraft of claim 8, wherein the thin film folding parawing is configured to unfold to a first high aspect ratio for daylight flight and a second high aspect ratio that is less than the first high aspect ratio configuring the aircraft for minimum power night flight at low trim velocity.

10. The long endurance powered aircraft of claim 8, comprising:
    a leading spar coupled to the energy storage system, the leading spar configured to selectively diverge from the energy storage system to define a morphing thin film folding parawing configured to change shape to optimize aircraft flight parameters in response to changes in at least one of altitude, air speed, angle of attack, lift-to-drag ratio, and maximum endurance.

11. The long endurance powered aircraft of claim 8, wherein the energy storage system comprises a nose cone enclosing at least a portion of the energy storage system, the energy storage system comprising a fuel cell coupled to a water tank disposed between and coupled to a hydrogen tank and an oxygen tank, the water tank configured to provide the aircraft with an adjustable center of mass as the fuel cell is charged/discharged.

12. A long endurance powered heavier-than-air aircraft comprising:
    an energy storage system functioning as a fuselage, the energy storage system comprising a closed-cycle regenerative fuel cell for night flight;

an electric motor and a propeller coupled to the energy storage system; and a ventral fin and a thin film energy collecting non-inflatable wing coupled to the energy storage system, the thin film energy collecting wing comprising:
- a leading edge spar,
- multiple battens including a first batten and a last batten, and
- multiple wing segments including a first wing segment coupled between the energy storage system and the first batten and a last wing segment coupled between the last batten and the leading edge spar, each wing segment formed of a flexible integrated solid energy cell sheet including flexible solar cells integrated with a flexible thin film foil, the flexible integrated solid energy cell sheets of the multiple segments structured to aerodynamically support the aircraft during flight.

13. The long endurance powered aircraft of claim 12, wherein the thin film energy collecting wing comprises solar cells configured to collect solar energy and convert the collected solar energy to electrical energy for powering the aircraft during daylight flight.

14. The long endurance powered aircraft of claim 12, wherein the energy storage system comprises a water tank and an electrolyzer configured to electrolytically separate water into hydrogen stored in a hydrogen tank and oxygen stored in an oxygen tank.

15. The long endurance powered aircraft of claim 12, wherein the closed-cycle regenerative fuel cell electrochemically reacts hydrogen stored in the hydrogen tank and oxygen stored in the oxygen tank to produce electrical energy employed to power the aircraft during night flight and a by-product of water stored in the water tank.

16. The long endurance powered aircraft of claim 12, wherein the energy storage system comprises the closed-cycle regenerative fuel cell coupled to a water tank disposed between and coupled to a hydrogen tank and an oxygen tank, the water tank configured to selectively adjust the aircraft's center of gravity as the closed-cycle regenerative fuel cell is charged/discharged.

17. The long endurance powered aircraft of claim 1, wherein the flexible integrated solid energy cell sheet comprises a first flexible conductive thin film foil integrated with the flexible solar cells, a second flexible conductive thin film foil, and a flexible dielectric layer disposed between the first flexible conductive thin film foil and the second flexible conductive thin film foil to define an energy storage capacitor.

18. The long endurance powered aircraft of claim 17, comprising:
flexible infrared cells integrated in the second flexible conductive thin film foil opposite of the flexible dielectric layer.

* * * * *